United States Patent
Carmichael et al.

(10) Patent No.: US 12,492,368 B2
(45) Date of Patent: Dec. 9, 2025

(54) MONITORING AIR PRESSURE WITHIN A CELL PROCESSING SYSTEM

(71) Applicant: Cellares Corporation, South San Francisco, CA (US)

(72) Inventors: Stephen G. Carmichael, San Mateo, CA (US); Joshua Shen, Castro Valley, CA (US); Bharat S. Thakkar, Campbell, CA (US); Yiming Xu, San Mateo, CA (US); Joon Mo Yang, Redwood City, CA (US)

(73) Assignee: Cellares Corporation, South San Francisco, CA (US)

( * ) Notice: Subject to any disclaimer, the term of this patent is extended or adjusted under 35 U.S.C. 154(b) by 0 days.

(21) Appl. No.: 19/075,709

(22) Filed: Mar. 10, 2025

(65) Prior Publication Data
US 2025/0283026 A1    Sep. 11, 2025

Related U.S. Application Data

(60) Provisional application No. 63/563,865, filed on Mar. 11, 2024.

(51) Int. Cl.
C12M 1/34 (2006.01)
C12M 1/00 (2006.01)
C12M 1/36 (2006.01)

(52) U.S. Cl.
CPC ............ *C12M 41/40* (2013.01); *C12M 29/14* (2013.01); *C12M 29/20* (2013.01); *C12M 41/48* (2013.01)

(58) Field of Classification Search
CPC ...... C12M 41/40; C12M 41/48; C12M 29/14; C12M 29/20
See application file for complete search history.

(56) References Cited

U.S. PATENT DOCUMENTS 3,728,227 A    4/1973   Elson et al.
4,234,023 A   11/1980   Sogi et al.
(Continued)

FOREIGN PATENT DOCUMENTS

CN    104203333 A    12/2014
CN    108660060 A    10/2018
(Continued)

OTHER PUBLICATIONS

ChargePoint (2021). Aseptic split butterfly valve 10-6 sterility assurance, located at https://www.thechargepoint.com/products/aseptic-split-butterfly-valve-10-6-sterility-assurance/, 2 total pages.
(Continued)

*Primary Examiner* — Michael L Hobbs
(74) *Attorney, Agent, or Firm* — Cooley LLP

(57) ABSTRACT

The present disclosure relates to systems and methods for monitoring pressure during automated cell processing. An illustrative method for monitoring pressure within a fluid device of an automated cell processing system includes coupling a fluid device having an air vent to a cell processing instrument. Next, the method includes transferring liquid between the fluid device and the instrument, determining a liquid transfer rate between the fluid device and instrument and an airflow rate through the air vent of the fluid device, and estimating an internal pressure of the fluid device based on the airflow rate and the liquid transfer rate. The fluid device may be a liquid transfer device, the instrument may be a liquid transfer instrument, and the system may facilitate liquid transfer between the liquid transfer device and a cell processing cartridge via the liquid transfer instrument.

25 Claims, 13 Drawing Sheets

(56) References Cited

U.S. PATENT DOCUMENTS

| | | |
|---|---|---|
| 4,696,902 A | 9/1987 | Bisconte |
| 4,839,292 A | 6/1989 | Cremonese |
| 4,911,833 A | 3/1990 | Schoendorfer et al. |
| 5,058,619 A | 10/1991 | Zheng |
| 5,656,491 A | 8/1997 | Cassani et al. |
| 6,102,678 A | 8/2000 | Peclat |
| 6,267,559 B1 | 7/2001 | Mossman et al. |
| 6,649,419 B1 | 11/2003 | Anderson |
| 7,550,287 B2 | 6/2009 | Hibino et al. |
| 7,745,209 B2 | 6/2010 | Martin et al. |
| 7,816,128 B2 | 10/2010 | Nakashima et al. |
| 8,158,426 B2 | 4/2012 | Wilson et al. |
| 8,158,427 B2 | 4/2012 | Wilson et al. |
| 8,168,432 B2 | 5/2012 | Wilson et al. |
| 8,273,572 B2 | 9/2012 | Martin et al. |
| 8,415,144 B2 | 4/2013 | Wilson et al. |
| 8,440,458 B2 | 5/2013 | Zijlstra et al. |
| 8,470,589 B2 | 6/2013 | Martin et al. |
| 8,492,140 B2 | 7/2013 | Smith et al. |
| 8,546,142 B2 | 10/2013 | Martin et al. |
| 8,697,443 B2 | 4/2014 | Wilson et al. |
| 8,727,132 B2 | 5/2014 | Miltenyi et al. |
| 8,809,044 B2 | 8/2014 | Wilson |
| 8,846,399 B2 | 9/2014 | Martin et al. |
| 8,956,860 B2 | 2/2015 | Vera et al. |
| 9,040,290 B2 | 5/2015 | Martin et al. |
| 9,045,721 B2 | 6/2015 | Martin et al. |
| 9,080,149 B2 | 7/2015 | Bosio et al. |
| 9,255,243 B2 | 2/2016 | Wilson et al. |
| 9,279,099 B2 | 3/2016 | Okano et al. |
| 9,290,730 B2 | 3/2016 | Martin et al. |
| 9,410,114 B2 | 8/2016 | Wilson et al. |
| 9,441,192 B2 | 9/2016 | Wilson et al. |
| 9,499,780 B2 | 11/2016 | Smith et al. |
| 9,534,195 B2 | 1/2017 | Smith et al. |
| 9,556,485 B2 | 1/2017 | Lin et al. |
| 9,567,565 B2 | 2/2017 | Vera et al. |
| 9,597,355 B2 | 3/2017 | Magnant |
| 9,625,463 B2 | 4/2017 | Miltenyi et al. |
| 9,701,932 B2 | 7/2017 | Smith et al. |
| 9,732,317 B2 | 8/2017 | Wilson |
| 9,783,768 B2 | 10/2017 | Larcher et al. |
| 9,845,451 B2 | 12/2017 | Martin et al. |
| 10,047,342 B2 | 8/2018 | Eibl et al. |
| 10,053,663 B2 | 8/2018 | Kabaha et al. |
| 10,119,970 B2 | 11/2018 | Miltenyi et al. |
| 10,131,876 B2 | 11/2018 | Kaiser et al. |
| 10,253,316 B2 | 4/2019 | Masquelier et al. |
| 10,294,658 B2 | 5/2019 | Scannon et al. |
| 10,323,258 B2 | 6/2019 | Bernate et al. |
| 10,329,559 B1 | 6/2019 | Masquelier et al. |
| 10,385,307 B2 | 8/2019 | Rowley et al. |
| 10,421,959 B1 | 9/2019 | Masquelier et al. |
| 10,508,288 B1 | 12/2019 | Bernate et al. |
| 10,519,437 B1 | 12/2019 | Masquelier et al. |
| 10,533,156 B2 | 1/2020 | Vera et al. |
| 10,584,333 B1 | 3/2020 | Masquelier et al. |
| 10,584,334 B1 | 3/2020 | Masquelier et al. |
| 10,588,994 B2 | 3/2020 | Kawamura et al. |
| 10,620,212 B2 | 4/2020 | Miltenyi et al. |
| 10,689,669 B1 | 6/2020 | Feldman et al. |
| 10,705,090 B2 | 7/2020 | Miltenyi et al. |
| 10,705,091 B2 | 7/2020 | Miltenyi et al. |
| 10,723,986 B2 | 7/2020 | Smith et al. |
| 10,724,043 B2 | 7/2020 | Sixto et al. |
| 10,844,338 B1 | 11/2020 | Smith et al. |
| 11,161,111 B2 | 11/2021 | Kabaha et al. |
| 11,198,845 B2 | 12/2021 | Parietti et al. |
| 11,371,018 B2 | 6/2022 | Shi et al. |
| 11,376,587 B2 | 7/2022 | Thakkar et al. |
| 11,447,745 B2 | 9/2022 | Shi et al. |
| 11,701,654 B2 | 7/2023 | Azersky et al. |
| 11,786,896 B2 | 10/2023 | Thakkar et al. |
| 11,826,756 B2 | 11/2023 | Azersky et al. |
| 11,872,557 B2 | 1/2024 | Biz et al. |
| 12,157,119 B2 | 12/2024 | Gerlinghaus et al. |
| 12,180,453 B2 | 12/2024 | Chang et al. |
| 2003/0030272 A1 | 2/2003 | Johnson et al. |
| 2005/0260743 A1 | 11/2005 | Drake et al. |
| 2006/0194193 A1 | 8/2006 | Tsuruta et al. |
| 2006/0257999 A1 | 11/2006 | Chang et al. |
| 2007/0185472 A1 | 8/2007 | Baumfalk et al. |
| 2008/0057568 A1 | 3/2008 | Kan et al. |
| 2008/0176318 A1 | 7/2008 | Wilson et al. |
| 2009/0042281 A1 | 2/2009 | Chang et al. |
| 2009/0247417 A1 | 10/2009 | Haas et al. |
| 2010/0301071 A1 | 12/2010 | Alstad et al. |
| 2011/0003380 A1 | 1/2011 | Miltenyi et al. |
| 2012/0138156 A1 | 6/2012 | Hofman et al. |
| 2012/0148415 A1 | 6/2012 | Brueckner |
| 2013/0115617 A1 | 5/2013 | Wilson |
| 2013/0189120 A1 | 7/2013 | Nelson et al. |
| 2014/0309795 A1 | 10/2014 | Norton et al. |
| 2015/0307829 A1 | 10/2015 | Dedry et al. |
| 2016/0208216 A1 | 7/2016 | Vera et al. |
| 2016/0303563 A1 | 10/2016 | Granier et al. |
| 2016/0320381 A1 | 11/2016 | Holmes et al. |
| 2016/0320422 A1 | 11/2016 | Fritchie et al. |
| 2017/0058527 A1 | 3/2017 | Williams et al. |
| 2017/0239420 A1 | 8/2017 | Wells |
| 2017/0307502 A1 | 10/2017 | Mason et al. |
| 2017/0313977 A1 | 11/2017 | Wilson |
| 2017/0321226 A1 | 11/2017 | Gill et al. |
| 2017/0362554 A1 | 12/2017 | Martin et al. |
| 2018/0031592 A1 | 2/2018 | Dority |
| 2018/0051243 A1 | 2/2018 | Hogan et al. |
| 2018/0078935 A1 | 3/2018 | Hung et al. |
| 2018/0185849 A1 | 7/2018 | Kaplan et al. |
| 2018/0196918 A1 | 7/2018 | Sadowski et al. |
| 2019/0212233 A1 | 7/2019 | Jovanovich et al. |
| 2019/0275519 A1 | 9/2019 | Castillo et al. |
| 2019/0292510 A1 | 9/2019 | Tandon et al. |
| 2019/0316120 A1 | 10/2019 | Masquelier et al. |
| 2020/0009557 A1 | 1/2020 | Frigard et al. |
| 2020/0025782 A1 | 1/2020 | Ahlfors |
| 2020/0095550 A1 | 3/2020 | Vera et al. |
| 2020/0159198 A1 | 5/2020 | Kapre et al. |
| 2020/0283713 A1 | 9/2020 | Ball et al. |
| 2020/0292552 A1 | 9/2020 | Miltenyi et al. |
| 2020/0353004 A1 | 11/2020 | Nowak et al. |
| 2020/0368411 A1 | 11/2020 | Camisani et al. |
| 2020/0406221 A1 | 12/2020 | Dabrowski et al. |
| 2021/0032583 A1 | 2/2021 | Smith et al. |
| 2021/0035655 A1 | 2/2021 | Tanouchi et al. |
| 2021/0047668 A1 | 2/2021 | Dabrowski et al. |
| 2021/0079344 A1 | 3/2021 | Bosio et al. |
| 2021/0147807 A1 | 5/2021 | Lickert et al. |
| 2021/0253997 A1 | 8/2021 | Wilson |
| 2021/0269755 A1 | 9/2021 | Smith et al. |
| 2021/0283565 A1* | 9/2021 | Gerlinghaus ......... C12M 23/42 |
| 2021/0283606 A1 | 9/2021 | Thakkar et al. |
| 2021/0301239 A1 | 9/2021 | Natsume et al. |
| 2021/0324318 A1 | 10/2021 | Parietti et al. |
| 2021/0354104 A1 | 11/2021 | Pesch et al. |
| 2022/0002652 A1 | 1/2022 | Patrick et al. |
| 2022/0143610 A1 | 5/2022 | Biz et al. |
| 2022/0150650 A1 | 5/2022 | Rucker |
| 2022/0163438 A1 | 5/2022 | Klas et al. |
| 2022/0282199 A1 | 9/2022 | Vann |
| 2022/0325219 A1 | 10/2022 | Parietti et al. |
| 2022/0347683 A1 | 11/2022 | Thakkar et al. |
| 2023/0149922 A1 | 5/2023 | Thakkar et al. |
| 2023/0321650 A1 | 10/2023 | Azersky et al. |
| 2023/0415154 A1 | 12/2023 | Pesch et al. |
| 2023/0415155 A1 | 12/2023 | Biz et al. |
| 2024/0018955 A1 | 1/2024 | Hannah et al. |
| 2024/0165613 A1 | 5/2024 | Azersky et al. |
| 2024/0167466 A1 | 5/2024 | Paraluppi |
| 2024/0254426 A1 | 8/2024 | Elpel et al. |
| 2024/0255537 A1 | 8/2024 | Malleo et al. |
| 2024/0279585 A1 | 8/2024 | Griffin et al. |
| 2024/0279588 A1 | 8/2024 | Malleo et al. |
| 2024/0318116 A1 | 9/2024 | Chang et al. |
| 2024/0326043 A1 | 10/2024 | Gerlinghaus et al. |

(56) References Cited

U.S. PATENT DOCUMENTS

| | | | |
|---|---|---|---|
| 2024/0369586 | A1 | 11/2024 | Tian et al. |
| 2024/0377420 | A1 | 11/2024 | Cesarek |
| 2024/0390897 | A1 | 11/2024 | Azersky et al. |
| 2024/0390898 | A1 | 11/2024 | Azersky et al. |
| 2024/0399365 | A1 | 12/2024 | Biz et al. |
| 2024/0402206 | A1 | 12/2024 | Boppart et al. |
| 2025/0002837 | A1 | 1/2025 | Bharat |
| 2025/0059492 | A1 | 2/2025 | Beban et al. |
| 2025/0065331 | A1 | 2/2025 | Malleo et al. |
| 2025/0066708 | A1 | 2/2025 | Burkeen et al. |
| 2025/0066709 | A1 | 2/2025 | Grout et al. |

FOREIGN PATENT DOCUMENTS

| | | |
|---|---|---|
| EP | 0246912 A2 | 11/1987 |
| EP | 0991389 A1 | 4/2000 |
| EP | 0824380 B1 | 1/2002 |
| EP | 3134512 B1 | 1/2019 |
| EP | 2809449 B1 | 10/2019 |
| EP | 3359294 B1 | 5/2020 |
| EP | 3928867 A1 | 12/2021 |
| GB | 2268187 A | 1/1994 |
| JP | 2007325586 A | 12/2007 |
| KR | 20130018286 A | 2/2013 |
| WO | WO-2006102416 A2 | 9/2006 |
| WO | WO-2006112870 A1 | 10/2006 |
| WO | WO-2006118282 A1 | 11/2006 |
| WO | WO-2007139742 A1 | 12/2007 |
| WO | WO-2009072003 A2 | 6/2009 |
| WO | WO-2017041051 A1 | 3/2017 |
| WO | WO-2017123663 A1 | 7/2017 |
| WO | WO-2018015561 A1 | 1/2018 |
| WO | WO-2018102471 A1 | 6/2018 |
| WO | WO-2020009700 A1 | 1/2020 |
| WO | WO-2020014264 A1 | 1/2020 |
| WO | WO-2021168368 A1 | 8/2021 |
| WO | WO-2021183687 A2 | 9/2021 |
| WO | WO-2021212124 A1 | 10/2021 |
| WO | WO-2024112702 A1 | 5/2024 |
| WO | WO-2024206703 A1 | 10/2024 |
| WO | WO-2025007051 A2 | 1/2025 |
| WO | WO-2025038974 A1 | 2/2025 |
| WO | WO-2025041046 A1 | 2/2025 |

OTHER PUBLICATIONS

CPC (2014). "6 traits of non-spill: How quick disconnect couplings evolved for low-pressure fluid handling," White Paper 8004, 4 total pages.
CPC (2014). "How single-use connections advance aseptic processing: Increased process flexibility and reliability, reduced costs," White Paper 7004, 6 total pages.
CPC (2018). Comparison Guide: Tube Welders and Aseptic Connectors, Technical Guide 7009, 3 total pages.
EMD Millipore (2015). "Lynx® S2S Connector—Low temperature compatibility (−80"C)," 4 total pages.
Final Office Action for U.S. Appl. No. 17/331,554 mailed Aug. 29, 2024, 18 pages.
Final Office Action for U.S. Appl. No. 18/799,963 mailed Jan. 30, 2025, 10 pages.
Final Office Action mailed on Apr. 28, 2022, for U.S. Appl. No. 17/198,134, filed Mar. 10, 2021, 11 pages.
Final Office Action mailed on Apr. 28, 2022, for U.S. Appl. No. 17/331,554, filed May 26, 2021, 16 pages.
Final Office Action mailed on Jul. 31, 2023, for U.S. Appl. No. 17/331,554, filed May 26, 2021, 19 pages.
Final Office Action mailed on Mar. 31, 2023, for U.S. Appl. No. 17/579,478, filed Jan. 19, 2022, 8 pages.
Garcia et al., "Microfluidic Screening of Electric Fields for Electroporation" Sci Rep. (2016) Feb. 19; 6:21238. pp. 1-11.
Genetic Engineering & Biotechnology News (2006). "Thermal welding for sterile connections," located at https://www.genengnews.com/magazine/47/thermal-welding-for-sterile-connections/, 5 total pages.
International Search Report and Written Opinion for PCT Application No. PCT/IB2024/058105 mailed Dec. 16, 2024, 12 pages.
International Search Report and Written Opinion for PCT Application No. PCT/US2024/022079 mailed Sep. 12, 2024, 25 pages.
International Search Report and Written Opinion for PCT Application No. PCT/US2024/042795 mailed Dec. 16, 2024, 11 pages.
International Search Report mailed on Oct. 13, 2021, for PCT Application No. PCT/US2021/021773, filed on Mar. 10, 2021, 13 pages.
Invitation to Pay Additional Fees for International Application No. PCT/US2024/022079 dated Jul. 17, 2024, 19 pages.
Jain, S. et al. (2011). "The complete automation of cell culture: improvements for high-throughput and high-content screening," J. Biomol. Screen 16:932-939.
Kato, R. et al. (2010). "A Compact, Automated Cell Culture System for Clinical Scale Cell Expansion from Primary Tissues," Tissue Engineering: Part C 16:947-956.
Kempner, M.E. and Felder, R.A., "A review of cell culture automation". JALA: Journal of the Association for Laboratory Automation (Apr. 2002); 7(2): 56-62.
Kino-Oka, M. et al. (2005). "Bioreactor Design for Successive Culture of Anchorage-Dependent Cells Operated in an Automated Manner," Tissue Engineering 11:535-545.
Knoll, A. et al. (2004). "Flexible automation of cell culture and tissue engineering tasks," Biotechnol. Prog. 20:1825-1835.
Lutkemeyer, D. et al. (2000). "First steps in robot automation of sampling and sample management during cultivation of mammalian cells in pilot scale," Biotechnol. Prog. 16:822-828.
MEDInstill (2021). INTACT™ Connectors, located at https://www.medinstill.com/intactconnectors.php, 1 total page.
Millipore® (2020). "Technical Brief—Choosing the right sterile connector based on design and sterility test results," 4 total pages.
Millipore Sigma (2020). "Lynx® CDR Connectors," Datasheet, 4 total pages.
Millipore Sigma (2021). Lynx® CDR Connectors, located at https://www.emdmillipore.com/US/en/product/Lynx-CDR-Connectors, MM_NF-C188801, 2 total pages.
Non-Final Office Action for U.S. Appl. No. 18/244,051 mailed Oct. 9, 2024, 10 pages.
Non-Final Office Action for U.S. Appl. No. 18/759,602 mailed Feb. 20, 2025, 15 pages.
Non-Final Office Action for U.S. Appl. No. 18/759,602 mailed Nov. 8, 2024, 10 pages.
Non-Final Office Action for U.S. Appl. No. 18/792,358 mailed on Nov. 6, 2024, 5 pages.
Non-Final Office Action for U.S. Appl. No. 18/799,963 mailed Sep. 30, 2024, 9 pages.
Non-Final Office action for U.S. Appl. No. 18/920,607 mailed Feb. 28, 2025, 10 pages.
Non-Final Office Action mailed on Apr. 24, 2024, for U.S. Appl. No. 17/331,554, filed May 26, 2021, 17 pages.
Non-Final Office Action mailed on Dec. 22, 2022, for U.S. Appl. No. 17/579,478, filed Jan. 19, 2022, 8 pages.
Non-Final Office Action mailed on Dec. 3, 2021, for U.S. Appl. No. 17/331,556, filed May 26, 2021, 9 pages.
Non-Final Office Action mailed on Feb. 3, 2022, for U.S. Appl. No. 17/198,134, filed Mar. 10, 2021, 5 pages.
Non-Final Office Action mailed on Jun. 26, 2023, for U.S. Appl. No. 17/198,134, filed Mar. 10, 2021, 15 pages.
Non-Final Office Action mailed on Mar. 16, 2023, for U.S. Appl. No. 17/331,554, filed May 26, 2021, 16 pages.
Non-Final Office Action mailed on Oct. 28, 2021, for U.S. Appl. No. 17/331,554, filed May 26, 2021, 11 pages.
Non-Final Office Action mailed on Oct. 6, 2021, for U.S. Appl. No. 17/198,134, filed Mar. 10, 2021, 7 pages.
Non-Final Office Action mailed on Sep. 13, 2023, for U.S. Appl. No. 18/141,329, filed Apr. 28, 2023, 7 pages.
Notice of Allowance for U.S. Appl. No. 17/331,554 mailed Mar. 5, 2025, 8 pages.

(56) References Cited

OTHER PUBLICATIONS

Notice of Allowance for U.S. Appl. No. 18/487,884 mailed Feb. 26, 2025, 8 pages.
Notice of Allowance for U.S. Appl. No. 18/792,358 mailed on Mar. 3, 2025, 8 pages.
Notice of Allowance for U.S. Appl. No. 18/792,360 mailed Mar. 4, 2025, 9 pages.
Notice of Allowance for U.S. Appl. No. 18/792,360 mailed on Jan. 29, 2025, 9 pages.
Notice of Allowance for U.S. Appl. No. 18/810,388 mailed Jan. 21, 2025, 8 pages.
Notice of Allowance for U.S. Appl. No. 18/810,388 mailed on Oct. 9, 2024, 9 pages.
Notice of Allowance mailed on Apr. 11, 2024, for U.S. Appl. No. 17/198,134, filed Mar. 10, 2021, 9 pages.
Notice of Allowance mailed on Jul. 18, 2023, for U.S. Appl. No. 17/849,422, filed Jun. 24, 2022, 8 pages.
Notice of Allowance mailed on Jul. 25, 2023, for U.S. Appl. No. 17/579,478, filed Jan. 19, 2022, 8 pages.
Notice of Allowance mailed on Jun. 8, 2023, for U.S. Appl. No. 17/849,422, filed Jun. 24, 2022, 8 pages.
Notice of Allowance mailed on Mar. 1, 2022, for U.S. Appl. No. 17/331,556, filed May 26, 2021, 8 pages.
Notice of Allowance mailed on Mar. 22, 2023, for U.S. Appl. No. 17/992,784, filed Nov. 22, 2022, 8 pages.
Notice of Allowance mailed on Oct. 4, 2023, for U.S. Appl. No. 18/141,329, filed Apr. 28, 2023, 8 pages.
Pharma Japan, "Astellas Set to Cut Development Time with Cell Culture Robot, Eyes 4 Billion Yen Profit per Product" Aug. 9, 2023, 3 pages.
Qu, B. et al., "Droplet Electroporation in Microfluidics for Efficient Cell Transformation with or without Cell Wall Removal," Lab Chip (2012) 12:4483-4488.
Saint Gobain (2017). "Pure-Fit® SC—Secure aseptic connections," Brochure, 5 total pages.
Sartorius Stedim Biotech (2011). "Opta® SFT," 4 total pages.
Schwartz C., "Optimizing Cell Separation with Beckman Coulter's Centrifugal Elutriation System," Beckmann Coulter Life Sciences (2014) 6 total pages.
SeriesLock™ (2021). Features and Specifications, located at https://serieslock.com/, 5 total pages.
Shi, Y. et al. (1992). "Performance of Mammalian Cell Culture Bioreactor with a New Impeller Design," Biotechnology and Bioengineering 40:260-270.
Steris (2018). "A compilation of material compatibilities with vaporized hydrogen peroxide," 2 total pages.
Steris (2018). "Sterility assurance levels (SALS): Irradiation," 3 total pages.
Steris (2020). "Overview of sterilization technology comparison," 1 total page.
Strahlendorf, K.A. et al. (2009). "Bio Pharm International—A review of sterile connectors," vol. 2009 Supplement, Issue 8, located at https://www.biopharminternational.com/view/review-sterile-connectors, 9 total pages.
U.S. Appl. No. 18/988,628, filed Dec. 19, 2024, by Marchiando et al.
U.S. Appl. No. 29/898,923, filed Aug. 2, 2023, by Gerlinghaus et al.
Written Opinion of the International Searching Authority mailed on Oct. 13, 2021, for PCT Application No. PCT/US2021/021773, filed on Mar. 10, 2021, 20 pages.

* cited by examiner

MONITORING AIR PRESSURE WITHIN A CELL PROCESSING SYSTEM

CROSS REFERENCE TO RELATED APPLICATIONS

This application claims priority to U.S. Provisional Patent Application No. 63/563,865 filed Mar. 11, 2024, the content of which is incorporated herein by reference in its entirety for all purposes.

TECHNICAL FIELD

The present disclosure relates to systems, devices, and methods for monitoring air pressure during automated cell processing.

BACKGROUND

Cell processing generally involves collecting and manufacturing cell products for therapeutic use. These cell products often achieve effective and robust clinical responses in patients. However, cell processing is a complex, often labor-intensive process that is difficult to scale up and is prone to human error and contamination. While recent efforts have been made regarding, for example, the ability to automate movements of cells between processing steps, conventional cell processing procedures still include numerous inefficiencies. For example, traditional procedures often include manual transfer of fluids between cell processing steps, inviting risk of human error and contamination at each fluid transfer step (e.g., collecting samples, replenishing culture media, etc.). Given the importance of maintaining sterility during fluid transfer, cell processing systems employing automated fluid transfer are preferable to non-automated systems or partially automated systems lacking this capability.

Monitoring automated fluid transfer in such systems can further enhance efficiency and safety during cell processing. Specifically, monitoring pressure within system components may help to prevent system damage due to overpressurized or underpressurized components, therefore preventing system damage resulting from overpressurization or underpressurization.

Therefore, there is a need for novel cell processing systems with fully integrated, automated fluid transfer and methods for monitoring internal pressure of such systems during the fluid transfer.

SUMMARY

Described herein are systems, devices, and methods useful for cell processing. A method for monitoring pressure within a liquid transfer system of an automated cell processing system may include releasably coupling a sterile liquid transfer device (SLTD) to a sterile liquid transfer instrument (SLTI), where the SLTD may include a housing and an air vent, the housing configured to hold a volume of liquid. Next, the method may include transferring liquid between the SLTD and the SLTI, determining a liquid transfer rate between the SLTD and SLTI, determining an airflow rate through the air vent of the SLTD, and estimating an internal pressure of the SLTD based on the airflow rate and the liquid transfer rate. In some variations, the airflow rate may be determined indirectly via a sensor coupled to the air vent, or directly via a flow rate sensor at the air vent. In some variations, the internal pressure of the SLTD may be estimated periodically at a fixed or variable time interval during the liquid transfer. The liquid may include one or more of a cell culture medium, a buffer, and a solvent. In some variations, determining the liquid transfer rate may include directly determining the flow rate with a liquid flow rate sensor.

In some variations, determining the liquid outflow rate or the liquid inflow rate may include determining an operational speed of a pump, which may be a peristaltic pump, configured to control the liquid transfer. Determining the operational speed of the pump may include calculating the operational speed via a real-time image of the pump.

The method may further include comparing the internal pressure of the STLD to a threshold and modifying a cell processing procedure when the internal pressure is about equal to or greater than the threshold. Modifying the cell processing procedure may include notifying an operator via a user interface of the automated cell processing system. In some variations, notifying the operator may include generating one or both of a visual notification and an audio notification via the user interface. Modifying the cell processing procedure may additionally or alternatively include reducing or stopping the liquid transfer. Further, reducing or stopping the liquid transfer may include reducing an operational speed of a pump configured to control the liquid transfer.

In some variations, transferring liquid between the SLTD and the SLTI may include transferring a first liquid from the SLTD to the SLTI and transferring a second liquid to the SLTD from the SLTI. Determining the transfer rate may then include indirectly determining a liquid outflow rate of the first liquid from the SLTD to the SLTI and indirectly determining a liquid inflow rate of the second liquid from the SLTI to the SLTD. Moreover, estimating the internal pressure of the SLTD may be based on the airflow rate, the liquid outflow rate, and the liquid inflow rate.

In some variations, the method may further include, prior to transferring liquid between the SLTD and the SLTI, coupling a cartridge for cell processing to the SLTI such that the cartridge and the SLTI are configured to perform a cell processing operation. Further, transferring liquid between the SLTD and the SLTI may include transferring liquid from the SLTD to the cartridge via the SLTI, or to the SLTD from the cartridge via the SLTI.

In some variations, the liquid transfer rate may be a first liquid transfer rate, the airflow rate may be a first airflow rate, and the internal pressure may be a first internal pressure estimate, and the method may further include recording the first internal pressure estimate, transferring the SLTD within the automated cell processing system, determining a second liquid transfer rate relative to the SLTD, determining a second airflow rate of air through the air vent of the SLTD when the air vent is in the open configuration, and estimating a second internal pressure of the SLTD based on the first internal pressure estimate, the airflow rate, and the second liquid transfer rate. The SLTI may be a first SLTI, and transferring the SLTD may include releasing the STLD from the first SLTI and releasably coupling the SLTD to a second SLTI. The method may further include, prior to determining the second liquid transfer rate, transferring liquid between the SLTD and the second SLTI.

The SLTD may further include a collar couplable to the housing. In some variations, the collar may include a plurality of conduits, a sterile liquid transfer port in fluid communication with the plurality of conduits, and a fluid pump module with compressible fluidic tubing coupled between an inlet port and an outlet port. Each of the inlet port and the outlet port may be in fluid communication with the plurality of conduits, and the compressible fluidic tubing may be configured to be compressed by a pump to control movement of fluids out of the housing. In some variations, the pump may be supported by the SLTI and may be releasably couplable to the compressible fluidic tubing of the SLTD.

Another method for monitoring pressure within a fluid device of an automated cell processing system may include releasably coupling the fluid device to an instrument for cell processing, where the fluid device may include a housing and an air vent, and the housing may be configured to hold a volume of liquid. Next, the method may include transferring liquid between the fluid device and the instrument, determining a liquid transfer rate between the fluid device and instrument, determining an airflow rate through the air vent of the fluid device, and estimating an internal pressure of the fluid device based on the airflow rate and the liquid transfer rate.

DETAILED DESCRIPTION

Described herein are systems and methods for automated (fully or partially automated) cell processing including monitoring pressure (e.g., internal pressure) of such systems during automated fluid transfer operations. Accordingly, the systems and methods herein may provide solutions for performing fluid transfer without introducing contamination and/or human error into a cell processing procedure, thus enabling high-throughput manufacture of cell products. Further, the systems and methods herein may be used to manage operating conditions and prevent system damage (e.g., due to overpressurization or underpressurization of components used for fluid transfer) during an automated cell processing procedure.

The automated cell processing systems ("systems") herein may generally include a workcell housing one or more cell processing instruments ("instruments") and a cell processing cartridge ("cartridge") configured to be received within the workcell and moved between the instruments (e.g., via a robotic arm of the workcell) to process a cell product carried by the cartridge. The cartridge may include one or more cell processing modules ("modules") configured to interface with a cell processing instrument to perform one or more cell processing operations. In some variations, one or more instruments may include liquid transfer instruments (e.g., sterile liquid transfer instruments) configured to enable fluid transfer to and/or from a cartridge coupled thereto.

Figure 2A:
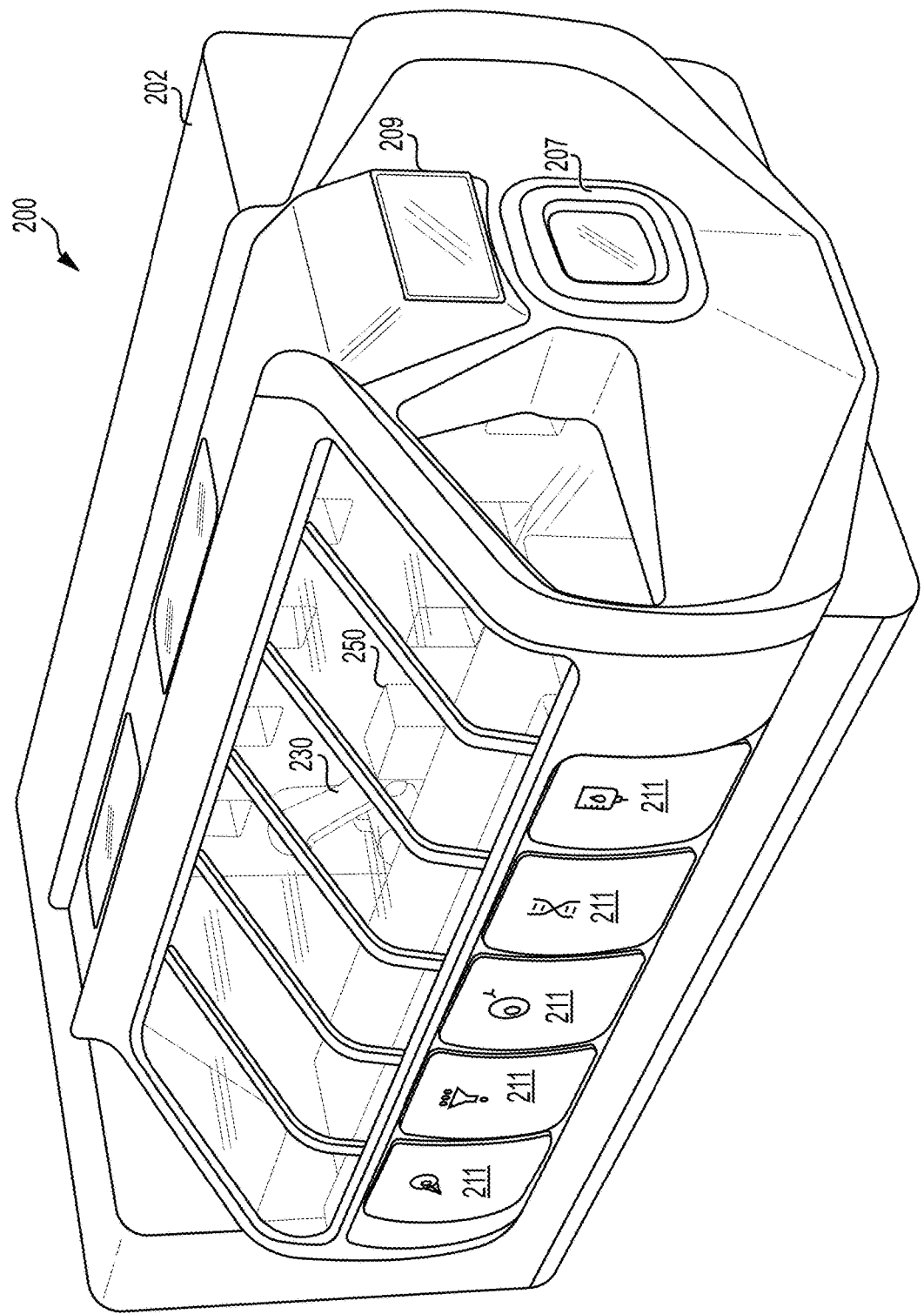
FIG. 2A is a perspective view of an illustrative variation of a cell processing system.

A perspective view of an exemplary automated cell processing system 200 ("system 200") is shown in FIG. 2A. The system 200 may include a workcell 202 housing one or more instruments, such as a plurality of instruments 211, and a cartridge 250 (containing a cell product) that is configured to be loaded into the workcell 202 via a feedthrough 207. The cartridge 250 may be configured to be moved between the instruments of the workcell 202. For example, a robotic arm 230 may be configured to move the cartridge 250 between instruments. One or more of the instruments may be configured to couple, engage, or interface with the cartridge 250 to perform cell processing steps (e.g., one or more steps, a plurality of steps) on cells within the cartridge 250. Further, each instrument may be configured to perform a different cell processing step when coupled to a corresponding module of the cartridge 250. In some variations, the cartridge 250 may include any number of modules, such as one or more of a bioreactor module, a counterflow centrifugal elutriation (CCE) module, a magnetic cell sorter module (MCS), an electroporation module, a sorting module (e.g., fluorescence activated cell sorting (FACS) module), an acoustic flow cell module, a microfluidic enrichment module, a spinoculation module, and/or the like. In some variations, the workcell 202 may be configured to process two or more cartridges 250 in parallel. For example, the each of plurality of instruments (e.g., each of instruments 211) may have a receiving bay for interfacing with a cartridge (e.g., cartridge 250), allowing multiple instruments within the workcell 202 to be in use at any given time. Moreover, an operator may view and/or modify aspects of active and/or upcoming cell processing procedures via the display 209 of the workcell 202.

In general, the systems herein may include a workcell that stores one or more fluid devices (e.g., within a storage vault), such as a plurality of fluid devices. As described in detail with respect to FIGS. 5A-5C a fluid device may include a housing for containing a fluid (e.g., a liquid) therein and an air vent or port for providing a pathway for air to travel between the housing and the external environment of the fluid device. For example, the air vent may be configured to open (e.g., to transfer from a closed configuration to an open configuration) during fluid transfer so that air may enter or escape the housing (e.g., through a sterile filter). The fluid device may be configured to be moved throughout the workcell (e.g., via a robotic arm) such that the system may facilitate automated fluid transfers (which may or may not be sterile fluid transfers) between the fluid device and a cell processing instrument (e.g., a liquid transfer instrument) and/or cartridge (e.g., when the cartridge is interfacing with the instrument). For example, the fluid device may be moved to the instrument and releasably coupled thereto such that fluid may be transferred between (i.e., to and/or from) the fluid device and the cartridge. In some variations, the fluid device may be releasably coupled to the instrument and the cartridge, or only to the cartridge. Additionally, or alternatively, the system may perform automated fluid transfers between the fluid device(s) and other components of the system, such as other cartridges and/or sample collection vessels, other fluid devices, fluid sources, storage vaults, and/or the like.

When transferring fluid to and/or from a fluid device, there may be risk of overpressurizing or underpressurizing the device. For example, in some variations, the fluid device may be sealed except for its air vent that opens during liquid transfer and allows air to transfer between the housing of the fluid device and the external environment (e.g., via a sterile filter). It may be possible for the air vent to become clogged during liquid transfer (e.g., liquid is a mixture including solid particles). A clogged air vent may overpressurize the fluid device, potentially causing damage to the system (e.g., due to a broken or exploded fluid device). Moreover, an underpressurized fluid device may leak, which may also cause damage to the system. Further, either one of an overpressurized or underpressurized fluid device may not only result in incorrect fluid transfer due to less than all the fluid transferring in or out of the fluid device, but also potentially contaminate the liquid product. Therefore, it may be important to monitor the internal pressure of the fluid devices to reduce the risk of damaging the cell processing system.

Accordingly, the methods herein may allow for monitoring pressure within an automated cell processing system, such as for monitoring pressure within a fluid device of the system during fluid transfer. For example, the methods may include coupling (e.g., releasably coupling via a robotic arm) a fluid device having an air vent to a cell processing instrument and/or to a cell processing cartridge interfacing with the instrument. The methods may include transferring liquid between the fluid device and the instrument and/or the cartridge, and estimating the internal pressure of the fluid device based on one or both of an airflow rate between the housing and the air vent and a liquid flow rate between the housing and the instrument and/or cartridge. The fluid flow rates (e.g., airflow and/or liquid flow rates) may be determined indirectly, such as via the instrument coupled to the fluid device. For example, the instrument may include one or more sensors for indirectly monitoring the airflow and/or liquid flow rates of the fluid device. In some variations, the instrument may include a sensor (e.g., an airflow meter) that couples to the air vent of a fluid device (when the fluid device is coupled to the instrument) to determine the airflow rate between the housing of the fluid device and the air vent. As another example, one or more components of the instrument itself may be monitored to estimate the internal pressure of the fluid device. To transfer fluid between the fluid device and the instrument (e.g., to and/or from a cartridge interfacing with the instrument), the instrument may include a pump (e.g., a peristaltic pump) configured to engage with the fluid device. Accordingly, in some variations, the operational speed (e.g., rotational speed) of the pump, which may be manually and/or automatically controlled by the system (e.g., via a controller), may provide a known liquid flow rate of liquid transferring in and/or out of the fluid device.

Additionally, or alternatively, in some variations, the fluid device may include one or more sensors (e.g., pressure gauges) for directly detecting pressure within the housing. However, incorporating an internal sensor into the housing may be complicated and costly. For example, an internal sensor may need to be sealed and protected (e.g., from liquid within the housing), and may require a connection to the instrument to take measurements. Thus, it may not be feasible to directly monitor the pressure of the fluid device using an internal sensor. Instead, it may be beneficial to monitor the internal pressure of a fluid device indirectly (e.g., via an instrument coupled thereto).

Further, in some variations, the risk of a fluid device becoming overpressurized or underpressurized may be mitigated by performing an airflow test through the vent. The airflow test may include, prior to performing a fluid transfer, measuring the airflow rate (e.g., with a sensor coupled to the air vent) through the vent and comparing the measured rate to a threshold to determine if the vent is clogged and/or closed. For example, a measured airflow rate above a first threshold may indicate that the air vent is clogged, and a measured airflow rate above a second, greater threshold may indicate that the vent is closed. Thus, risk of the fluid device becoming overpressurized may be ascertained via the airflow test. However, in some variations, the air vent may include a plurality of air pathways (e.g., via a plurality of tubes coupled to the vent), and it may not be feasible to perform the airflow test for each pathway. Further, it may be possible for the vent to become clogged after the test (e.g., during fluid transfer). Thus, it may be preferable to periodically (e.g., continuously, or in burst, at a constant or varied rate) monitor the internal pressure of the fluid device during fluid transfer.

The internal pressure may be estimated using the Ideal Gas Law, which describes the relationship between air pressure and air volume for a given amount of air. With respect to the fluid device, the air volume may be defined by the total volume of the housing of the fluid device minus the volume occupied by liquid, and the amount of air may be accounted for by the air exchange to and from the housing via the air vent. The estimated internal air pressure may be expressed as follows, where p is the estimated pressure, $V_{total}$ is the total housing volume, $Q_{vent}$ and $Q_{liquid}$ are airflow and liquid flow rates, and $p_{atm}$ is the atmospheric pressure (for a new fluid device), or the latest internal pressure estimate (e.g., determined during a prior fluid transfer for a used fluid device):

$$p = \frac{V_{total} - \int Q_{vent} dt}{V_{total} - \int Q_{liquid} dt} p_{atm}$$

That is, throughout the liquid transfer, the airflow rate may be determined (e.g., periodically detected via a flow meter of the instrument) as a reference for the amount of air that flows into or out of the fluid device housing. Simultaneously, the liquid flow rate may be determined (e.g., via the operational speed of a pump of the instrument). These two rates may be used to determine a remaining volume of the fluid device that is occupied by air. An inflow of liquid into the fluid device housing may cause the internal air pressure to increase, in turn creating an outflow of air through the air vent. Oppositely, an outflow of liquid from the fluid device housing may cause the internal air pressure to decrease, in turn creating an inflow of air through the air vent and into the housing. A real-time estimation of the internal air pressure of the fluid device may be obtained by comparing the cumulative volumes of the liquid flow and the airflow. As an example, the liquid flow and airflow volumes may be about the same (e.g., the liquid flow rate may be about equal to the air flow rate) when the air vent is fully operational (e.g., open and unblocked). Thus, differing liquid flow and airflow volumes may indicate that the air vent is not fully operational (e.g., at least partially closed and/or at least partially blocked).

In some variations, the real-time estimations of internal pressure of the fluid device may be tracked and displayed (e.g., via a display of the workcell) for operator reference. Additionally, or alternatively, in some variations, the real-time internal pressure estimation may be compared to a pressure condition, which may be a safety threshold (e.g., one or more high-pressure and/or low-pressure thresholds), to determine if the fluid device is overpressurized and/or underpressurized. If the fluid device is determined to have an unsafe internal pressure (e.g., above a high-pressure threshold or below a low-pressure threshold), the system (e.g., a controller thereof) may be configured to prompt an operator to intervene, and/or may be configured to automatically resolve the issue (e.g., by reducing or stopping the fluid transfer and/or removing the fluid device from the instrument).

Exemplary variations of systems, devices, and methods for monitoring air pressure during automated cell processing are described in further detail below.

I. Cell Processing Systems

Generally, the cell processing systems herein may be automated (e.g., fully or partially) and configured for high-throughput manufacturing of cell products for biomedical applications. Any suitable cell processing procedure may be performed using the systems and devices described herein, and may include steps such as growing, enriching, selecting, sorting, expanding, activating, transducing, electroporating, washing, and the like. For example, a cell processing procedure may include the steps of digesting tissue using an enzyme reagent to release a select cell population into solution, enriching cells using a CCE instrument, washing cells using the CCE instrument, selecting cells in the solution using a selection instrument, sorting cells in the solution using a sorting instrument, differentiating or expanding the cells in a bioreactor, activating cells using an activating reagent, electroporating cells, transducing cells using a vector, and finishing a cell product.

Figure 1A:
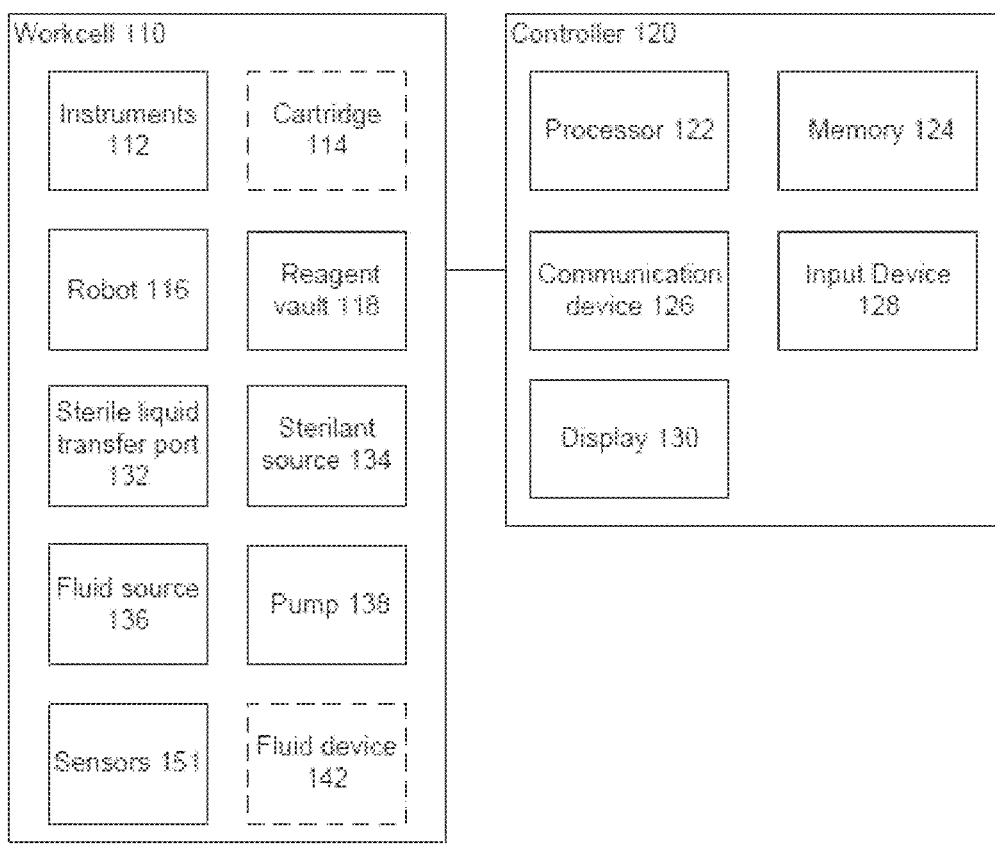
FIG. 1A is a block diagram of an illustrative variation of a workcell of a cell processing system.

An illustrative cell processing system for use with the automated fluid transfer devices methods herein is shown in FIG. 1A. Shown there is a block diagram of a cell processing system 100 comprising a workcell 110 and controller 120. The workcell 110 may comprise one or more of an instrument 112, a robot 116 (e.g., robotic arm), a reagent vault 118, a sterile liquid transfer port 132, a sterilant source 129, a fluid source 136, a pump 138, and a sensor(s) 151. Cartridge(s) 114 and fluid device(s) 142, which may be provided outside of the workcell 110 and used within the workcell 110, are illustrated in dashed lines. In some variations, a fluid device 142 may be a liquid transfer device, such as a sterile liquid transfer device (SLTD). However, it should be appreciated that the fluid device 142 may be configured to transfer any fluid (which includes liquids), whether sterile or not. The controller 120 may comprise one or more of a processor 122, a memory 124, a communication device 126, an input device 128, and a display 130.

The workcell 110 may comprise a fully, or at least partially, enclosed housing inside which one or more cell processing steps are performed in a fully, or at least partially, automated process. In some variations, the workcell may be an open system lacking an enclosure, which may be configured for use in a clean room, a biosafety cabinet, or other sterile location. A cartridge 114 may be moved using the robot 116 to reduce manual labor in the cell processing steps, and fluid transfers into and out of the cartridge 114 may also be performed in a fully or partially automated process, as will be described in detail herein. For example, one or more fluids may be stored in a fluid device 142. In some variations, the fluid device may be configured to be moved within the system 100 by the robot 116. A sterile liquid transfer port 132 may be coupled between any set of fluid-carrying components of the system 100 (e.g., cartridge 114, reagent vault 118, fluid source 136, fluid device 142, etc.). For example, a first sterile liquid transfer port may be coupled between a first cartridge and a corresponding sterile liquid transfer port of a fluid device.

Figure 2B:
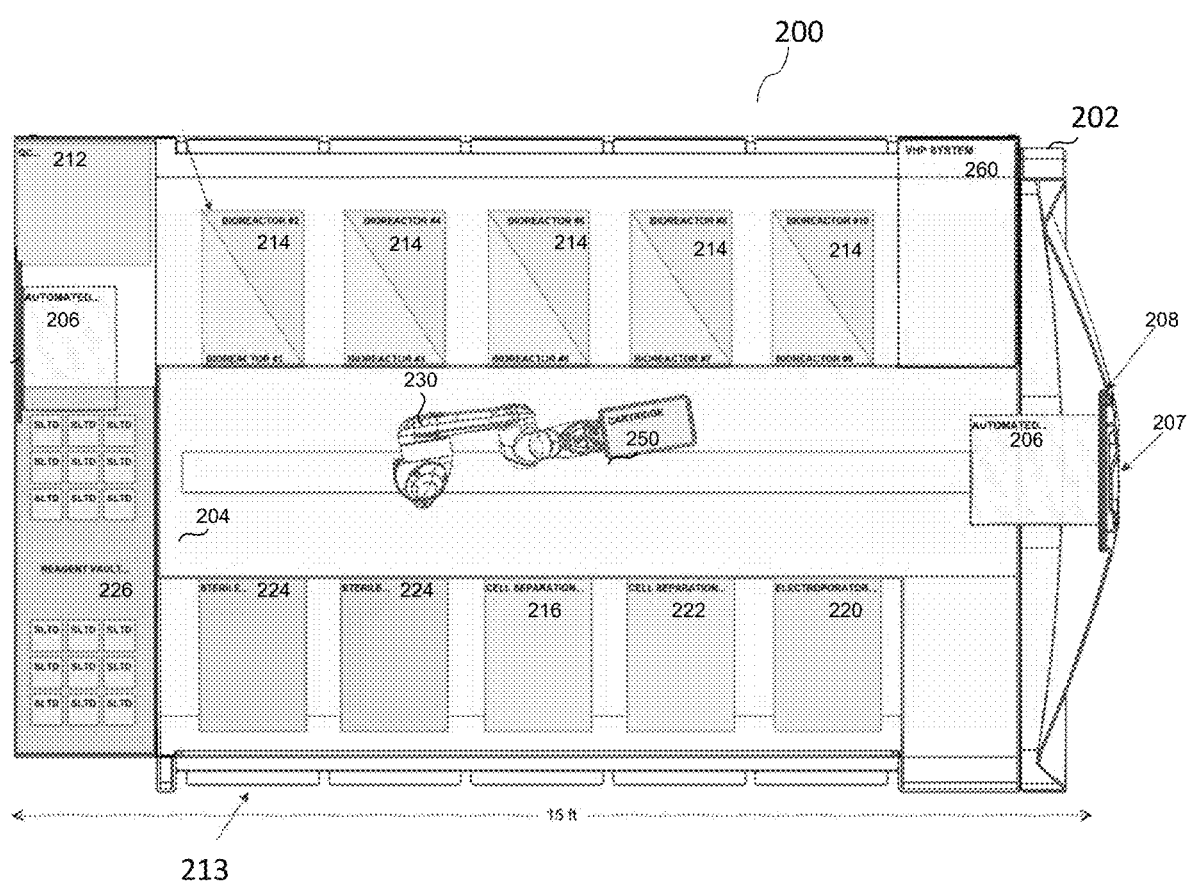
FIG. 2B is a top view of an interior of the cell processing system of FIG. 2A.

The workcells herein may generally house one or more instruments, such as instruments 112, within an interior zone thereof, or within individual slots or bays within the workcell. Referring briefly to FIG. 2B, the instruments may include, for example, one or more of a bioreactor instrument 214, a cell selection instrument 216 (e.g., a magnetic separation instrument), an electroporation instrument 220, a counterflow centrifugation elutriation (CCE) instrument 222, a sterile liquid transfer instrument 224 (e.g., for facilitating automated fluid transfers), a reagent vault 226, and a sterilization system 260.

Moreover, the robots for use with the cell processing systems described herein may be capable of moving cartridges between slots or bays containing the instruments so that the modules within the cartridge can couple to corresponding instruments within the workcell to perform different cell processing steps. Further, the robots for use with the cell processing systems described herein may be capable of moving and manipulating fluid devices within the workcell. For instance, the robot may be capable of moving a reagent storing fluid device from a reagent vault of the workcell to a sterile liquid transfer instrument of the workcell so that automated fluid transfer between the reagent storing fluid device and a cartridge can be performed. As shown in FIG. 1A, the robot 116 may be configured to move cartridges 114 between different instruments to perform a predetermined sequence of cell processing steps. In this way, multiple cartridges 114 may be processed in parallel, as different steps of the cell processing sequence may be performed at the same time on different cartridges.

Generally, a robot of the workcell may comprise any mechanical device capable of moving a cartridge and/or a fluid device from one location to another location within the workcell. For example, the robot may comprise a mechanical manipulator (e.g., an arm) in a fixed location, or attached to a linear rail, or a 2- or 3-dimensional rail system. While shown in some of the Figures as being fixed in place or with respect to a rail system, the robot need not be so. For example, in some variations, the robot comprises a wheeled device. Any number of robots may be used within the workcell, as described herein. For example, in some variations, the workcell comprises two or more robots of the same or different type (e.g., two robotic arms each independently configured for moving cartridges between instruments). The robot may also comprise an end effector for precise handling of different cartridges or fluid devices or for barcode scanning or radio-frequency identification tag (RFID) reading.

In some variations, reagent vault(s) 118 may be configured to store reagents, including but not limited to cell culture media, buffer, cytokines, proteins, enzymes, polynucleotides, transfection reagents, non-viral vectors, viral vectors, antibiotics, nutrients, cryoprotectants, solvents, cellular materials, and pharmaceutically acceptable excipients. Additionally, or alternatively, waste may be stored in the reagent vault, or within a fluid device within the reagent vault. In some variations, in-process samples extracted from one or more cartridges may be stored in the reagent vault, or in a fluid device 142 within the reagent vault. The reagent vault may comprise one or more controlled temperature compartments (e.g., freezers, coolers, water baths, warming chambers, or others, at e.g., about −80° C., about −20° C., about 4° C., about 25° C., about 30° C., about 37° C., and about 42° C.). Temperatures in these compartments may be varied during the cell manufacturing process to heat or cool reagents.

Further, in some variations, the reagents, waste, and/or extracted in-process samples, among others, may be stored within fluid device(s) 142 within the reagent vault 118. To this end, the fluid device(s) 142 may be transferred to a cartridge within the workcell or a cartridge may be moved by the robot 116 (or manually by an operator) to the reagent vault 118. The reagent vault 118 may be configured to interface with one or more sterile liquid transfer ports on the cartridge, and the reagent or material may be transferred from a fluid device 142 within the reagent vault into the cartridge. Optionally, fluid is added or removed from the cartridge before, during, or after addition or removal of the reagent or material. In some variations, the instruments 112 of the workcell 110 comprise a sterile liquid transfer system including a sterile liquid transfer instrument similarly configured to automatically transfer fluid into or out of the cartridge 114 via one or more fluid device(s) 142. The sterile liquid transfer instrument may be stocked with reagents by, for example, a robot 116 that moves fluid device(s) 142 comprising the reagents from a workcell feedthrough or other location to the sterile liquid transfer instrument. In some variations, the robot 116 moves a fluid device(s) 142 from the reagent vault 118 to the sterile liquid transfer instrument. The reagent vault 118 may have automated doors to permit access by the robot 116 to a fluid device(s) 142 stored therein. The fluid device(s) 142 may be configured for pick-and-place movement by the robot 116. In some variations, the reagent vault 118 may comprise one or more sample pickup areas. For example, the robot 116 may be configured to move one or more fluid devices 142 comprising reagents to and from one or more of the sample pickup areas.

In some variations, the sensor(s) 151 of the workcell 110 comprise sensors (e.g., optical sensor(s), airflow sensor(s), liquid flow sensor(s), and/or the like) of a sterile liquid transfer instrument. The sensor(s) 151 may be used during an automated fluid transfer procedure to aid in monitoring internal pressure of a fluid device 142 during a fluid transfer operation. For example, the sensor(s) 151 may include one or more cameras configured to image an instrument pump (e.g., a rotor thereof) to determine an operational speed of the pump. In some variations, the controller 120 may be configured to operate the pump and may thus set (and modify) the operational speed of the pump. The one or more cameras may additionally or alternatively be used to detect the presence or absence of fluid within fluid conduits of the fluid device 142 (e.g., via windows of the fluid device to). Additionally, or alternatively, the sensor(s) 151 may include one or more flow meters (e.g., airflow and/or liquid flow meters) for determining flow rates (e.g., airflow and/or liquid flow rates) of fluid relative to the fluid device 142 during fluid transfer.

The cell processing system 100 may comprise a controller 120 (e.g., computing device) comprising one or more of a processor 122, memory 124, communication device, 126, input device 128, and display 130. The controller 120 may be configured to control (e.g., operate) the workcell 110. For example, the controller 120 may be configured to monitor the internal pressure of one or more fluid devices (e.g., simultaneously) during fluid transfer operations. That is, the controller 120 may control liquid and/or air flow detection (e.g., via sensor(s) of the instruments), and may also control the operational speed of the pump coupled to a fluid device 142 during fluid transfer. Thus, the controller 120 may determine the airflow and liquid flow rates with respect to the fluid device 142, and may use these rates to estimate the internal pressure of the fluid device 142. The controller 120 may comprise a plurality of devices. For example, the workcell 110 may enclose one or more components of the controller 120 (e.g., processor 122, memory 124, communication device 126) while one or more components of the controller 120 may be provided remotely to the workcell 110 (e.g., input device 128, display 130).

The processor (e.g., processor 122) may process data and/or other signals to control one or more components of the system. The processor may be configured to receive, process, compile, compute, store, access, read, write, and/or transmit data and/or other signals. Additionally, or alternatively, the processor may be configured to control one or more components of a device (e.g., console, touchscreen, personal computer, laptop, tablet, server).

In some variations, the processor may be configured to access or receive data and/or other signals from one or more of workcell 110, server, controller 120, and a storage medium (e.g., memory, flash drive, memory card, database). In some variations, the processor may be any suitable processing device configured to run and/or execute a set of instructions or code and may include one or more data processors, image processors, graphics processing units (GPU), physics processing units, digital signal processors (DSP), analog signal processors, mixed-signal processors, machine learning processors, deep learning processors, finite state machines (FSM), compression processors (e.g., data compression to reduce data rate and/or memory requirements), encryption processors (e.g., for secure wireless data transfer), and/or central processing units (CPU). The processor may be, for example, a general-purpose processor, Field Programmable Gate Array (FPGA), an Application Specific Integrated Circuit (ASIC), a processor board, and/or the like. The processor may be configured to run and/or execute application processes and/or other modules, processes and/or functions associated with the system. The underlying device technologies may be provided in a variety of component types (e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like.

The processor may operate the systems/perform the methods herein using software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including structured text, typescript, C, C++, C#, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

The memory (e.g., memory 124) may be configured to store data and/or information. In some variations, the memory may include one or more of a random-access memory (RAM), static RAM (SRAM), dynamic RAM (DRAM), a memory buffer, an erasable programmable read-only memory (EPROM), an electrically erasable read-only memory (EEPROM), a read-only memory (ROM), flash memory, volatile memory, non-volatile memory, combinations thereof, and the like. In some variations, the memory may store instructions to cause the processor to execute modules, processes, and/or functions associated with the device, such as image processing, image display, sensor data, data and/or signal transmission, data and/or signal reception, and/or communication. Some embodiments described herein may relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The computer code (also may be referred to as code or algorithm) may be those designed and constructed for the specific purpose or purposes. In some variations, the memory may be configured to store any received data and/or data generated by the controller and/or workcell. In some variations, the memory may be configured to store data temporarily or permanently.

The input device (e.g., input device 128) may comprise or be coupled to a display (e.g., display 130). Input device may be any suitable device that is capable of receiving input from a user, for example, a keyboard, buttons, touch screen, etc. The input device may include at least one switch configured to generate a user input. For example, an input device may include a touch surface for a user to provide input (e.g., finger contact to the touch surface) corresponding to a user input. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device including at least one switch, a switch may have, for example, at least one of a button (e.g., hard key, soft key), touch surface, keyboard, analog stick (e.g., joystick), directional pad, mouse, trackball, jog dial, step switch, rocker switch, pointer device (e.g., stylus), motion sensor, image sensor, and microphone. A motion sensor may receive user movement data from an optical sensor and classify a user gesture as a user input. A microphone may receive audio data and recognize a user voice as a user input.

Graphical and/or image data may be output on a display (e.g., display 130) of a cell processing system. In some variations, a display may include at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, and/or holographic display. In some variations, a GUI may be configured for designing a process and monitoring a product and may be shown on the display.

Further, in some variations, the controller may include a communication device (e.g., communication device 126) configured to communicate with another controller and one or more databases. The communication device may be configured to connect the controller to another system (e.g., Internet, remote server, database, workcell) by wired or wireless connection. In some variations, the system may be in communication with other devices via one or more wired and/or wireless networks. In some variations, the communication device may include a radiofrequency receiver, transmitter, and/or optical (e.g., infrared) receiver and transmitter configured to communicate with one or more devices and/or networks. The communication device may communicate by wires and/or wirelessly.

Cartridges

Figure 1B:
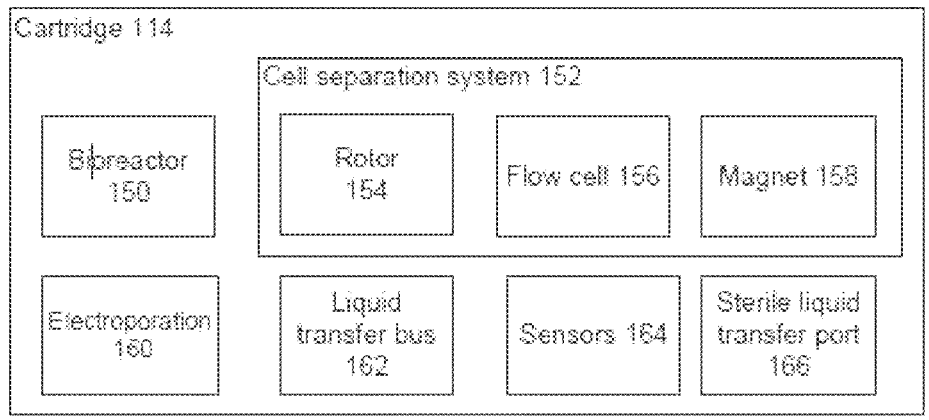
FIG. 1B is a block diagram of an illustrative variation of a cartridge of the cell processing system.

The cell processing systems described herein may comprise one or more cartridges configured to contain a cell product for processing. The cartridge(s) may include one or more modules configured to interface with one or more instruments within the workcell. For example, as illustrated in FIG. 1B, a cartridge 114 may comprise one or more of a bioreactor 150, a cell separation system 152, an electroporation module 160, a fluid transfer bus 162, a sensor(s) 164, and a sterile liquid transfer port 166. As described in more detail herein, the sterile liquid transfer port 166 may be couplable to a corresponding sterile liquid transfer port of a fluid device, such as a fluid device 142 of FIG. 1A, for automatically transferring fluids between the cartridge 114 and the fluid device. In some variations, the cartridge 114 may include one or more sterile liquid transfer ports 166 (e.g., a plurality thereof) for coupling to a corresponding sterile liquid transfer port of one or more fluid devices such that one or more fluids may be transferred between the cartridges and fluid devices in parallel. Moreover, in some variations, a plurality of cartridges may be processed in parallel within one or more workcells of an automated cell processing system.

Various materials may be used to construct the cartridge and the cartridge housing, including metal, plastic, rubber, and/or glass, or combinations thereof. The cartridge, its components, and its housing may be molded, machined, extruded, 3D printed, or any combination thereof. The cartridge may contain components that are commercially available (e.g., tubing, valves, fittings)—these components may be attached or integrated with custom components or devices. The housing of the cartridge may constitute an additional layer of enclosure that further protects the sterility of the cell product.

In some variations, the cartridge modules may be comprised of distinct sections that are integrated in a fixed configuration within the cartridge. Additionally, or alternatively, the modules may be configurable or moveable within the cartridge, permitting various formats of cartridges to be assembled. For example, the cartridge can be a single, closed unit with fixed components for each module, or the cartridge may contain configurable modules coupled by configurable fluidic, mechanical, optical, and electrical connections. In some variations, one or more sub-cartridges, each containing a set of modules, may be used to perform various cell processing workflows. The modules may each be provided in a distinct housing or may be integrated into a cartridge or sub-cartridge with other modules. The disclosure generally shows modules as distinct groups of components for the sake of simplicity, but it should be noted that these modules may be arranged in any suitable configuration. For example, the components for different modules may be interspersed with each other such that each module is defined by the set of connected components that collectively perform a predetermined function. However, the components of each module may or may not be physically grouped within the cartridge. In some variations, multiple cartridges may be used to process a single cell product through transfer of the cell product from one cartridge to another cartridge of the same or different type and/or by splitting cell product into more cartridges and/or pooling multiple cell products into fewer cartridges.

Generally, each of the instruments within the workcell interfaces with its respective module or modules on the cartridge. For example, when a cartridge has an electroporation module, it is moved by the robot to the electroporation instrument within the workcell to perform electroporation on the cells within the cartridge. One advantage of such split module/instrument designs is that expensive components (e.g., motors, sensors, heaters, lasers, etc.) may be retained in the instruments of the system while less expensive components reside in the cartridge, which can be configured for single-use. The use of disposable cartridges may eliminate the need to sterilize cartridges between use. Furthermore, having multiple instruments within the workcell further helps allow for the parallel utilization of those instruments when multiple cartridges are used within the workcell. In contrast, most conventional semi-automated instruments have instrument components that sit idle and are incapable of simultaneous parallel use.

In some variations, the cartridge comprises a sterile liquid transfer port for fluid transfer into and out of the cartridge. In some variations, the cartridge comprises any number of sterile liquid transfer ports and any number or position of fluid paths between modules and the sterile liquid transfer ports.

The sterile liquid transfer ports described herein may form a sterile fluid pathway between a fluid device and a cartridge and/or a first cartridge and a second cartridge to enable fluid transfer that may be sterile, fully automated, and precisely metered (e.g., precise control of a transferred fluid volume). In some variations, the robot may be configured to operate the sterile liquid transfer port to open and close a set of ports and valves thereof to permit fluid flow between a fluid device and a cartridge and/or a first cartridge and a second cartridge. The use of a robot and controller to operate the sterile liquid transfer port may facilitate automation and sterility of a cell processing system.

Additional aspects of suitable cartridges are provided e.g., in U.S. patent application Ser. No. 17/198,134, published as U.S. Patent Publication No. 2021/0283565, entitled "Systems and Methods for Cell Processing", which is incorporated by reference herein.

Workcell

A workcell of an automated cell processing system may be configured to receive one or more cartridges for processing (e.g., for parallel processing of a plurality of cartridges) therein. FIG. 2B shows an interior view of the illustrative cell processing system 200 of FIG. 2A. Shown there is workcell 202. The workcell may be divided into an interior zone 204 with a feedthrough 206 access, and quality control (QC) instrumentation 212. An air filtration inlet (not shown) may provide high-efficiency particulate air (HEPA) filtration to provide ISO7 or better air quality in the interior zone 204. In some embodiments, this air filtration may maintain sterile cell processing in an ISO8 or ISO9 manufacturing environment. The workcell 202 may also have an air filter on the air outlet to preserve the ISO rating of the room. Similar to the workcell described above in reference to FIG. 1A, the workcell 203 may further comprise, inside the interior zone 104, a bioreactor instrument 214, a cell selection instrument 216 (e.g., a magnetic separation instrument), an electroporation instrument 220, a counterflow centrifugation elutriation (CCE) instrument 222, a sterile liquid transfer instrument 224 (e.g., for facilitating automated fluid transfers), a reagent vault 226, and a sterilization system 260. The sterilization system 260 may be connectable to a fluid device for sterilization of a sterile liquid transfer port during an automated fluid transfer process. The reagent vault 226 may be accessible through a sample pickup port 228. A robot 230 (e.g., support arm, robotic arm) may be configured to move one or more cartridges 250 from any instrument to any other instrument, move one or more cartridges 250 to and from the reagent vault 226, and/or move one or more fluid devices between the reagent vault 226 and the sterile liquid transfer instrument 224.

The reagent vault 226 may be accessible by a user through a sample pickup port 228. A robot 230 (e.g., support arm, robotic arm, etc.) may be configured to move one or more cartridges 250 from any instrument to any other instrument, move one or more cartridges 250 to and from the reagent vault 226, and/or move one or more fluid devices between the reagent vault 226 and the sterile liquid transfer instrument 224. In some variations, the workcell 202 may comprise one or more moveable barriers 213 (e.g., access, door) configured to facilitate access to one or more of the instruments in the workcell 203.

In some variations, a human operator may load one or more cartridges 250 into the feedthrough 206. The cartridges 250 may be pre-sterilized, or the feedthrough 206 may sterilize the cartridge 250 using ultraviolet radiation (UV) or chemical sterilizing agents provided as a spray or wash. The feedthrough 206 chamber may optionally be configured to automatically spray, wash, irradiate, or otherwise treat cartridges (e.g., with ethanol and/or isopropyl alcohol solutions) to maintain sterility of the interior zone 204 (e.g., ISO 7 or better) or the biosafety cabinet 208 (e.g., ISO 5 or better). The cartridge 250 may be passed to the biosafety cabinet 208, where input cell product is provided and loaded to the cartridge 250. The user may then move the cartridge 250 back to the feedthrough 206 and initiate automated cell processing using a computer processor in the computer server rack 210 (e.g., controller 120). The robot 230 may be configured to move the cartridge 250 in a predefined sequence to a plurality of instruments and stations, with the components of the workcell 200 being controlled by the computer processor of the computer server rack 210.

Liquid Transfer System for Automated Fluid Transfer

The workcell may generally house one or more liquid transfer systems, such as one or more sterile liquid transfer systems ("SLTS"), therein. A liquid transfer system may be configured for automatically transferring fluids (e.g., liquids or sterile liquids) between components of the system. For example, an SLTS may include a workcell instrument, such as a sterile liquid transfer instrument (SLTI), a cartridge, and a fluid device, such as a sterile liquid transfer device (SLTD). While specific examples of liquid transfer systems are shown and described herein (e.g., those including SLTI(s) and/or SLTD(s)), it should be understood that any suitable cell processing instrument or fluid device may be used with the systems and methods described. Generally, the liquid transfer systems described herein may be configured for the automated transfer of fluid between a fluid device and an instrument and/or a cartridge (e.g., between a fluid device and a cartridge via an instrument interfacing with the cartridge), such as fluid devices described below with reference to FIGS. 5A-5C. In a workcell, the liquid transfer system may include one of a plurality of instruments, and a robot of a materials handling system of the workcell may move cartridges between a first liquid transfer system and one or more second liquid transfer systems, each including a unique instrument (e.g., SLTI). Cartridges may be moved to and from the liquid transfer system(s), and fluid devices may be separately moved to and from the liquid transfer system(s) in order to allow for addition of reagents, biological materials, and the like to the cartridge as well as the removal of reagents, waste, biological materials (e.g., samples), and the like from the cartridge.

Figure 3:
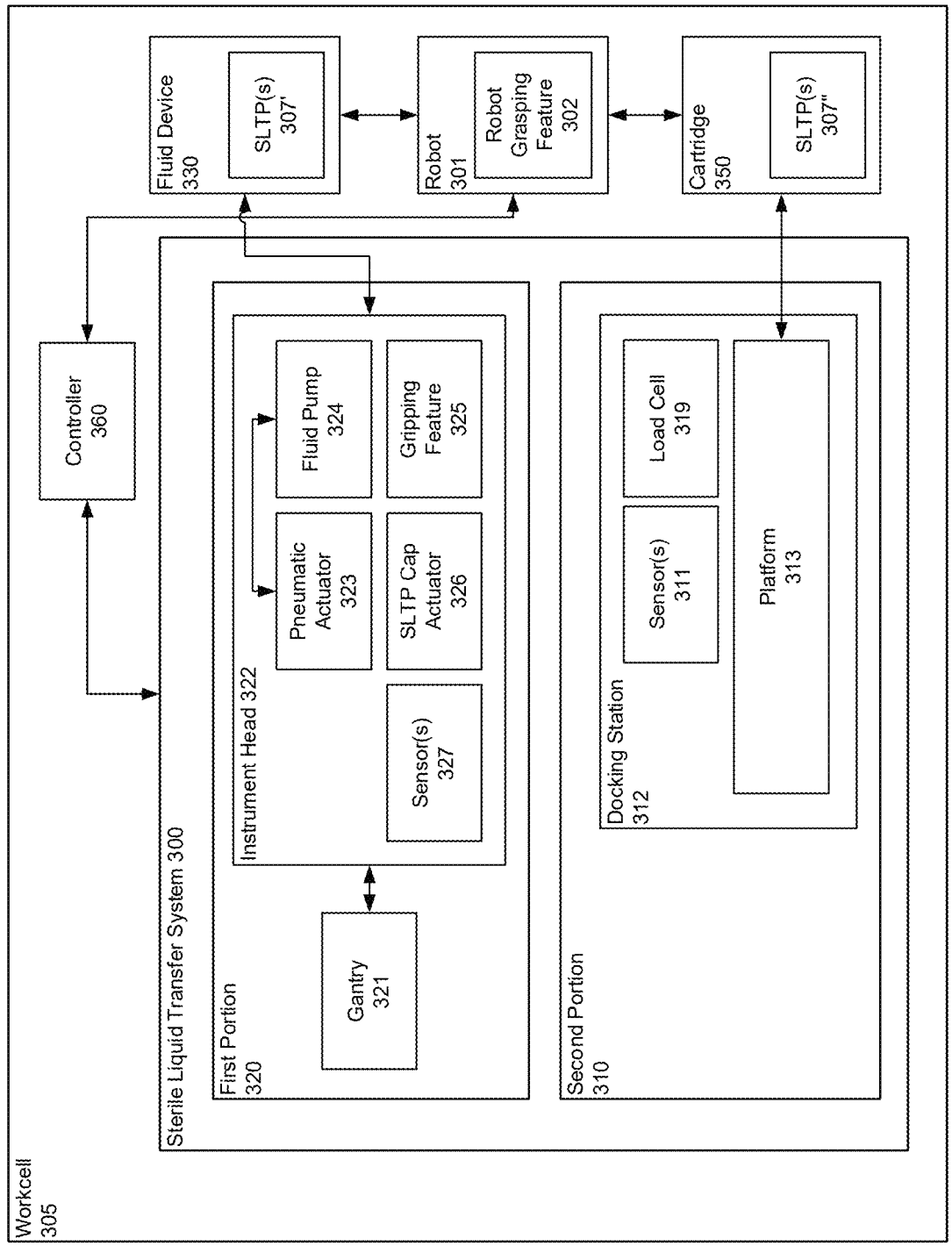
FIG. 3 is a schematic diagram of an illustrative system for automated fluid transfer by a sterile liquid transfer system within a cell processing system.

A schematic diagram of an illustrative system 300 for automated fluid transfer, including a fluid device, a cartridge, and a workcell is provided in FIG. 3. In some variations, the sterile liquid transfer system 300 may be or include an instrument (e.g., an SLTI) within a workcell 305, such as the workcell of FIGS. 2A-2B. The sterile liquid transfer system 300 may be configured to receive, at a first portion 320 of the sterile liquid transfer system 300, a fluid device 330. The fluid device 330 may be provided to an instrument head 322 of the first portion 320 of the sterile liquid transfer system 300 by a robot(s) 301 of a material handling system of the workcell 305. The robot(s) 301 may comprise a robot grasping feature 302 configured to engage robot engagement feature(s) of the fluid device 330 (see FIG. 2F and FIG. 2G). The sterile liquid transfer system 300 may be configured to receive, at a second portion 310 of the sterile liquid transfer system 300, a cartridge 350. The cartridge 350 may be provided to a platform 313 of a docking station 312 of the second portion 310 of the sterile liquid transfer system 300 by the robot(s) 301 of the material handling system of the workcell 305. In some variations, the material handling system of the workcell 305 may comprise a single robot 301 configured to manipulate and move each of the fluid device 330 and the cartridge 350. In some variations, the material handling system of the workcell 305 comprises at least two robots 301, each configured to move one of the fluid device 330 and the cartridge 350. For example, a first robot may be configured with a first end effector to move fluid devices between the first portion 320 of the sterile liquid transfer system 300 and the reagent vault system and a second robot may be configured with a second end effector to move cartridges between instruments of the workcell 305 and second portion 310 of the sterile liquid transfer system 300.

In some variations, the fluid device 330 may comprise at least one sterile liquid transfer port 307'. In some variations, the cartridge 350 may comprise at least one sterile liquid transfer port 307". In some variations, the cartridge 350 may comprise a plurality of sterile liquid transfer ports" arranged in an array and each fluidically coupled to a reservoir, module, or the like within the cartridge 350.

In some variations, the workcell 305 may comprise therein at least one sterile liquid transfer system 300, a robot(s) 301, at least one fluid device 330, at least one cartridge 350, and a controller 360. It should be appreciated that the at least one sterile liquid transfer system 300, the at least one fluid device 300, and the at least one cartridge 350 are configured to be portable, disposable, and/or otherwise not be a permanent component of the workcell 305.

In some variations, and as noted above, the fluid device 330 may be moved or otherwise manipulated by the robot(s) 301 of the workcell 305 under the control of the controller 360. In some variations, the controller 360 sends signals to the robot(s) 301 to move and/or manipulate the fluid device 330 via the one or more robot engagement features of the fluid device 330. Movement and manipulation can include moving the fluid device 330 within the workcell 305, such as between the reagent vault system of the workcell 305 and the sterile liquid transfer system 300 of the workcell 305, and/or controlling an orientation of the fluid device 330. Similarly, the cartridge 350 may be moved or otherwise manipulated by the robot(s) 301 of the workcell 305 under the control of the controller 360. In some variations, the controller 360 sends signals to the robot(s) 301 to move and/or manipulate the cartridge 350. Movement and manipulation of the cartridge 350 can include moving the cartridge 350 between instruments within the workcell 305, such as between a bioreactor instrument, an electroporation instrument, a counterflow centrifugal elutriation instrument, and/or the like, and the sterile liquid transfer system 300.

In some variations, the sterile liquid transfer system 300 can be operably connected to the controller 360 such that data from the gantry 321 and the instrument head 322 of the first portion 320 can be provided to the controller 360 and such that the instrument head 322, and components thereof, can be controlled during a method of automated fluid transfer. In some variations, the controller 360 may receive data from the instrument head 312 that may include data corresponding to activity of the fluid pump 324, data from sensor(s) 327, the sterile liquid transfer port cap actuator 326, sterilization process ports of the fluid device 330, and/or at least one air vent of the fluid device 330. The data from sensor(s) 327 may correspond to fluid flow within fluid conduits of the fluid device 330. For example, the sensor(s) 327 may include one or more flow sensors (e.g., airflow sensors) configured to detect airflow into and out of an air vent of the fluid device 330. Additionally, or alternatively, in some variations, the sensors(s) 327 may include one or more flow sensors (e.g., liquid flow sensors) configured to detect liquid flow into and out of fluid conduits of the fluid device 330.

Data received by the controller 360 from the fluid pump 324 may include an (adjustable or predetermined) operational speed (e.g., a rotational speed, such as rotations/revolutions per minute), a direction of rotation, fault detection data, and/or the like. In some variations, an operational speed of the fluid pump 324 may be measured by imaging the rotor in real-time (e.g., recording the rotor using a camera). Data received by the controller 360 from the pneumatic actuator 323 may include positional data related to a rotor of the fluid pump 324. Such data can be used in conjunction with known characteristics such as a length and a diameter of the compressible fluidic tubing of the fluid pump 324, and with data from the sensor(s) 327 corresponding to fluid flow (e.g., airflow) within the fluid device 330 to determine or estimate a flow rate into and/or out of the fluid device 330. In some variations, data for the fluid pump 324 (e.g., an operational speed thereof, indicating a liquid flow rate relative to the fluid device 330) may be used with data from the sensor(s) 327 corresponding to fluid flow (e.g., airflow within the fluid device 330) to estimate an internal pressure of the fluid device 330.

This data may include properties (e.g., viscosity) of the fluid to be transferred. To this end, data received by the controller 360 from the sensor(s) 327 may include optical data obtained such as absorbance, reflectance, and/or fluorescence data of a fluid within fluid conduits of the fluid device 330. In some variations, the data received by the controller 360 from the sensor(s) 327 includes electromechanical data related to limit switches indicated a position of the fluid device 330 and or the cartridge 350, and the like. In some variations, the controller 360 may receive data from the gantry 321, including positional data of the instrument head 312 and a fluid device 330 hereon.

In some variations, the sensor(s) 327 may be configured to take measurements at a constant or varied rate. For example, one or more of the sensor(s) 327 (e.g., an air flow sensor couplable to the air vent of the fluid device 330 and/or a camera imaging the fluid pump 324) may take about 1 to about 2,000 measurements per second(s), such as about 10 to about 1,500 measurements/s, about 50 to about 1,000 measurements/s, about 100 to about 900 measurements/s, about 150 to about 850 measurements/s, about 200 to about 800 measurements/s, about 250 to about 750 measurements/s, about 300 to about 700 measurements/s, about 350 to about 650 measurements/s, or about 400 to about 600 measurements/s. In some variations, the rate at which the sensor(s) 327 take measurements may be adjustable, such as manually adjustable and/or automatically adjustable by the cell processing system (e.g., by the controller 360).

In some variations, data from each of the components of the workcell 305 described above can be integrated to perform automated fluid transfer. For example, the controller 360 may generate and/or send a signal to the robot(s) 301 to move, invert, couple, and/or decouple the fluid device 330 with the instrument head 322 of the sterile liquid transfer system 300 via the one or more robot engagement features of the fluid device 330. In some variations, when an internal pressure of the fluid device 330 is determined to meet a pressure condition (e.g., is out-of-range with respect to an acceptable range of pressures of the fluid device) during a fluid transfer operation, the controller 360 may be configured to stop the fluid transfer (e.g., by reducing the operational speed of the fluid pump 324) and/or to notify an operator (e.g., visually and/or audibly via a display of the workcell) that the internal pressure of the fluid device 330 may be unsafe. In some variations, the controller 360 may be configured to track and display (e.g., graphically via a display of the workcell) the internal pressure of the fluid device 330 in real-time (e.g., the internal pressure displayed to an operator may be updated with every new estimation made).

In some variations, the controller 360 may generate signals to the pneumatic actuator 323 and the fluid pump 324 to control a position of the fluid pump 324 and to control fluid transfer between the fluid device 330 and the cartridge 350. In some variations, a rotational velocity and/or a direction of rotation of a rotor of a peristaltic pump of the fluid pump 324 may be controlled in order to control bidirectional flow and flow rate of a fluid. In some variations, a predetermined occlusion of a compressible fluidic tubing of a fluid pump module of the fluid device 330 can be obtained by sending signals, from the controller 360, to the pneumatic actuator 323 to control movement of the pneumatic actuator 323 and the fluid pump 324 coupled thereto based on a linear translation of the pneumatic actuator 323 and/or based on a pressure sensed at the fluid pump 324. In some variations, the fluid pump 324 may include one or more fluid pumps, such as a plurality of fluid pumps (e.g., two, three, four, five, or more than five fluid pumps).

In some variations, the controller 360 generates and/or sends further signals to the gantry 321 and to the sterile liquid transfer port cap actuator 326 to manipulate a sterile liquid transfer port 307 of the fluid device 330 and a corresponding sterile liquid transfer port 307 of the cartridge 350 to allow sterile, automated, and precisely metered (e.g., precise control of a transferred fluid volume) fluid transfer. For example, the signals to the gantry 321 may include x-, y-, and z-axis coordinates for positioning the instrument head 312. In another example, the signals to the sterile liquid transfer port cap actuator 326 may include signals to control a configuration of the at least one port and valve of the sterile liquid transfer ports 307. In some variations, and as it relates to opening a flow path between the sterile liquid transfer port 324 of the fluid device 300 and a sterile liquid transfer port of another fluid device, the controller 360 may first be configured to generate a signal to the gantry 321 and a port signal to the sterile liquid transfer port cap actuator 326 to adjust a z-height of the instrument head 322 and couple the at least one port of the fluid device 330 to a corresponding port of the sterile liquid transfer port 307 of the cartridge 350. Coupling the at least one port 307 of the fluid device 330 to the corresponding port may comprise transitioning the ports to at least a partially open position. Next, the controller 360 may generate a valve signal to the gantry 321 to translate the instrument head 322 relative to the cartridge 350 to bring a valve of the sterile liquid transfer port 307' of the fluid device 330 into contact with a corresponding valve of the sterile liquid transfer port 307" of the cartridge 350. This can include adjusting a z-height of the instrument head to push the valves into a coupling arrangement. To finally open the fluid pathway, the controller 360 may then generate another valve signal to transition the valve and the corresponding valve to the open configuration. For example, the valves may operate on a push to connect principle. After fluid transfer, similar controlling signals can be generated to transition the sterile liquid transfer port 307 of the fluid device 330 and the corresponding sterile liquid transfer port 307 of the cartridge 350 to a closed configuration.

Figure 4B:
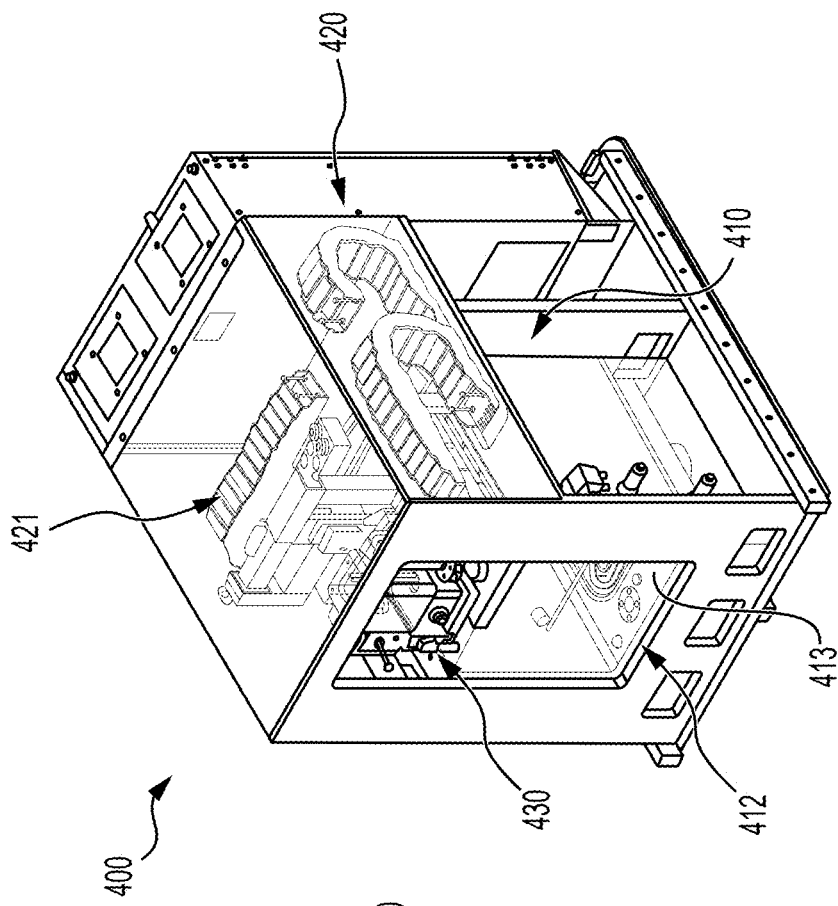
FIG. 4B is a transparent rendering of the sterile liquid transfer system of FIG. 4A.
Figure 4A:
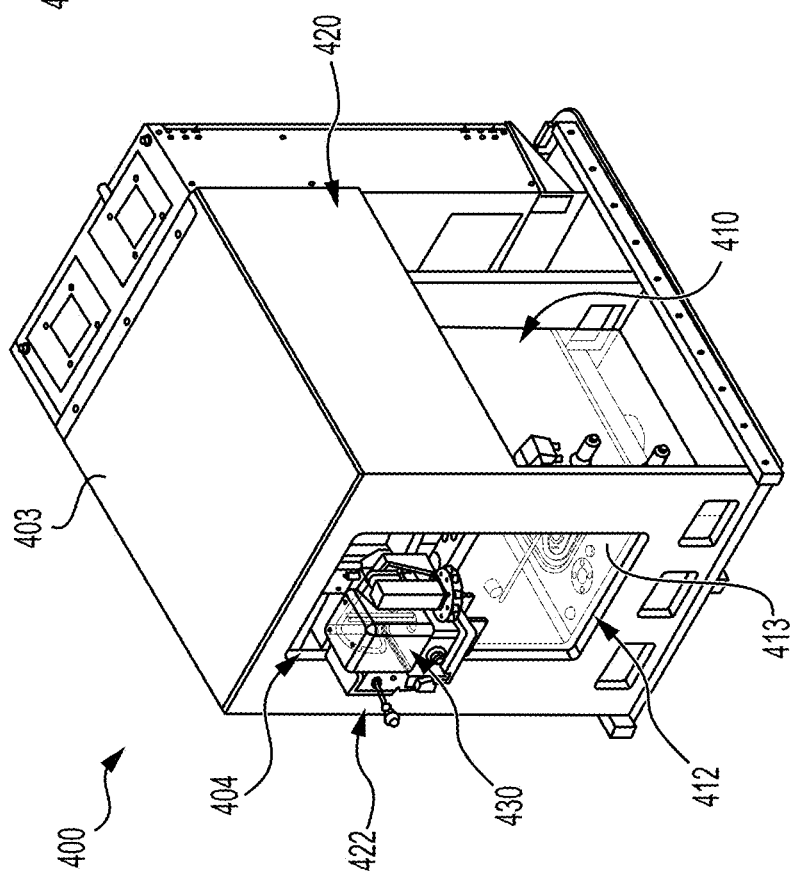
FIG. 4A is a rendering of an illustrative variation of a sterile liquid transfer system.

Renderings of views of an illustrative an SLTS for automated fluid transfer are provided FIG. 4A and FIG. 4B. In some variations, the sterile liquid transfer system 400 comprises a housing 403 and a first portion 420 and a second portion 410 therein. As shown in FIG. 4A, the first portion 420 comprises an instrument head 422 configured to receive a fluid device 430 via a window 404. The instrument head 422 may be coupled to and positionable by a gantry 421 within the first portion 420, as shown in FIG. 4B. The second portion 410 of the sterile liquid transfer system 400 comprises a docking station 412 and a platform 413 therein.

When a liquid transfer system, such as an SLTS, is used with the systems and methods described herein, it may include or be releasably coupled to fluid devices for automated fluid transfer. For example, one or more fluid devices may be releasably coupled to an instrument, such as an SLTI (e.g., via complementary liquid or sterile liquid transfer port) so that fluid may be transferred between the fluid device and a cartridge engaged with the instrument. In some variations, a fluid device may be a sterile liquid transfer device (SLTD) configured for sterile (and, in some variations, nonsterile) fluid transfers. To protect the fluid content of the SLTD from potential contamination, the SLTD may be sealed except for the air vent or port that opens during liquid transfer and allows air to transfer between the housing of the fluid device and the external environment (e.g., via a sterile filter).

Figure 5A:
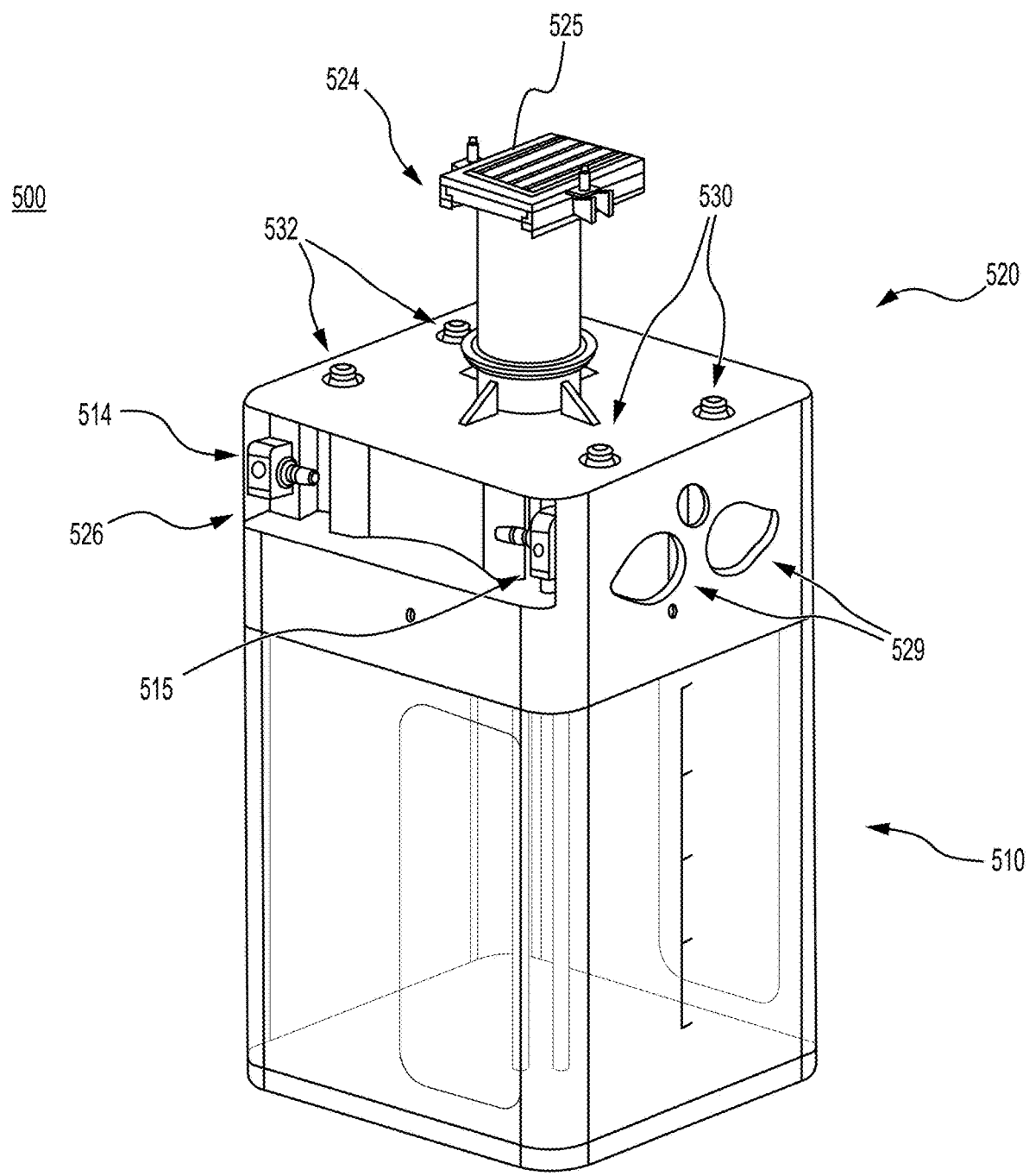
FIG. 5A is a rendering of a first perspective view of an illustrative fluid device for automated fluid transfer.
Figure 5B:
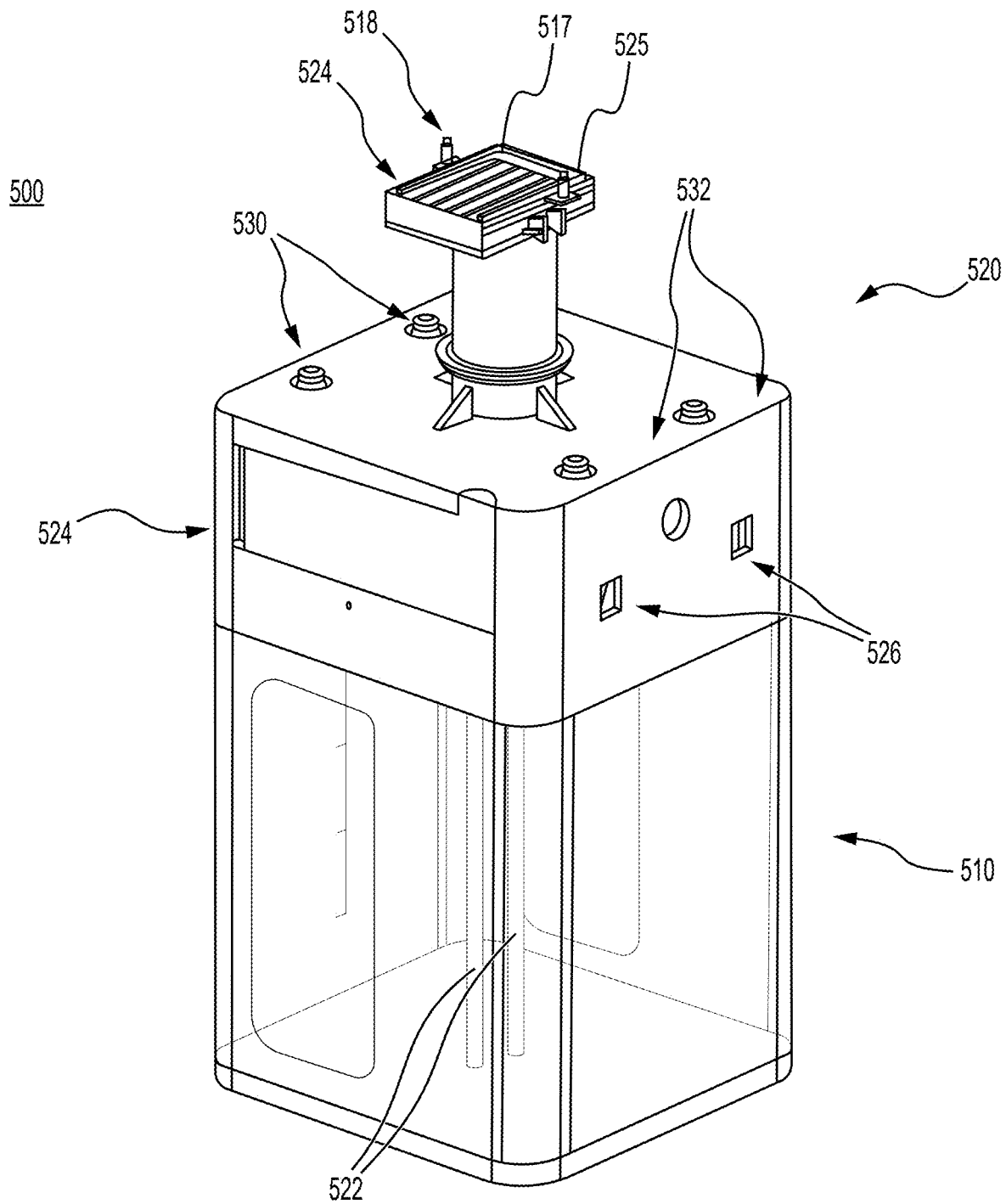
FIG. 5B is a rendering of a second perspective view of the fluid device of FIG. 5A.
Figure 5C:
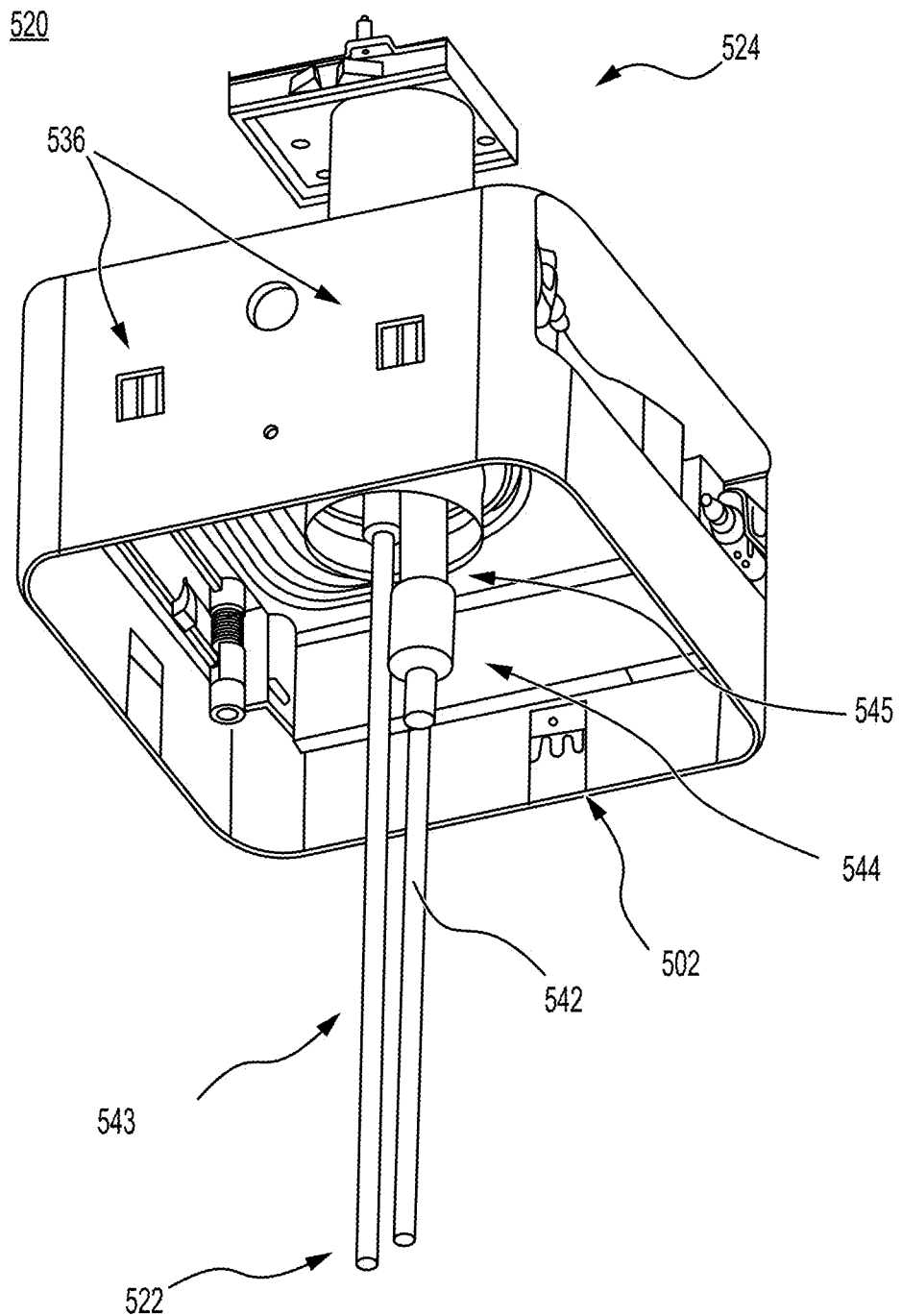
FIG. 5C is a rendering of a perspective view of an illustrative collar of the fluid device of FIGS. 5A and 5B.

Renderings of views of an exemplary fluid device 500 for automated fluid transfer are provided in FIGS. 5A-5C. In some variations, the fluid device 500 comprises a housing 510 and a collar 520 releasably couplable thereto. The collar may include an air vent, such as at least one air vent 532. The at least one air vent 532 may provide a pathway for air to enter or leave the fluid device 500 during fluid transfer (e.g., filling of the housing 510 and/or depleting of the housing 510). The at least one air vent 532 may be a vent having an open configuration (e.g., an active configuration during fluid transfer), and closed configured (e.g., a passive configuration when fluid is not being transferred to/from the fluid device 500). In some variations, the vent may automatically transition from the closed configuration to the open configuration when the fluid device 500 is connected to an instrument head of a cell processing instrument (e.g., an SLTI). Likewise, in some variations, the vent may automatically transition from the open configuration to the closed configuration when the fluid device 500 is decoupled to an instrument head of the instrument. In some variations, the vent may be configured to partially open. For example, the vent may be configured to open about 0 degrees to about 180 degrees, such as about 10 degrees to about 150 degrees, about 20 degrees to about 135 degrees, about 30 degrees to about 100 degrees, about 45 degrees to about 90 degrees, or about 50 degrees to about 75 degrees (e.g., about 45 degrees or about 90 degrees). Put another way, the vent may be configured to be about 1% open to about 100% open, such as about 10% open to about 90% open, about 20% open to about 80% open, about 30% open to about 70% open, about 40% open to about 60% open, or about 45% open to about 55% open (e.g., about 50% open). In some variations, a robot of the cell processing system may be configured to manipulate the air vent of the air processing port 532.

In some variations, the at least one air vent 532 may be connected to an air source (e.g., atmospheric air) via the port. In some variations, the air source may comprise compressed air, which may be used to purge the fluid conduits 522 of the collar 520 before and/or after fluid transfer therethrough (e.g., to perform an airflow test prior to a fluid transfer operation). In some variations, the at least one air vent 532 may comprise in-line filters, such as filter(s) 533. In some variations, the filter(s) 533 may be hydrophobic filters. In some variations, the filter(s) 533 may be sterilized filters. In some variations, the filter(s) 533 may be replaceable.

The housing 510 may be configured to hold a volume of fluid of about 1 mL to about 10 L, such as about 5 mL to about 5 L, about 10 mL to about 4 L, about 25 mL to about 3 L, about 50 mL to about 2 L, about 75 mL to about 1 L, about 100 mL to about 500 mL, or about 250 mL to about 400 mL. For example, the housing 510 may be configured to hold a volume of fluid of about 10 mL, about 25 mL, about 50 mL, about 75 mL, about 100 mL, about 250 mL, about 500 mL, about 750 mL, about 1 L, about 1.25 L, about 1.5 L, about 1.75 L, or about 2 L. in some variations, large-volume fluid devices (e.g., 1L compared to 50 mL or 10 mL) may have correspondingly larger tubing (e.g., venting tube 542 and/or liquid flow tube 546), and may be configured to withstand greater pump operational speeds, thus allowing for higher fluid flow rates to and/or from the fluid device during fluid transfer. Thus, large-volume fluid devices may experience rapid increases in internal pressure when the air vent (e.g., air vent 532) is blocked, and the system may accordingly rapidly identify an overpressurized large-volume fluid device.

Moreover, the housing 510 (and/or the fluid device 500) may be configured to withstand pressures of about −20 psi to about 20 psi, such as about −18 psi to about 18 psi, about −16 psi to about 16 psi, about −14 psi to about 14 psi, about −12 psi to about 12 psi, about −10 psi to about 10 psi, about −8 psi to about 8 psi, about −6 psi to about 6 psi, about −4 psi to about 4 psi, or about −2 psi to about 2 psi. Put another way, an acceptable pressure range for the housing 510 may be about −20 psi to about 20 psi, such as about −1 psi to about 12 psi, about 0 psi to about 11 psi, about 1 psi to about 10 psi, about 3 psi to about 8 psi, about 5 psi to about 9 psi, or about 7 psi to about 8 psi. For example, a high-pressure threshold for the housing 510 (and/or the fluid device 500) may be about 5 psi, about 6 psi, about 6.5 psi, about 7 psi, about 7.5 psi, about 8 psi, about 8.5 psi, about 9 psi, about 9.5 psi, about 10 psi, about 10.5 psi, about 11 psi, about 11.5 psi, about 12 psi, about 12.5 psi, about 13 psi, about 13.5 psi, about 14 psi, about 14.5 psi, about 15 psi, about 15.5 psi, or greater than about 15.5 psi. That is, if an internal pressure of the housing 510 is determined to be greater than, or greater than or about equal to, the high-pressure threshold (e.g., 8 psi, 9 psi, 10 psi, 11 psi, 12 psi, 13 psi, 14 psi, etc.), then air vent of the housing 510 (e.g., air vent 532) may be clogged and/or at least partially closed (and the fluid device may be at risk of breaking/exploding). Correspondingly, a low-pressure threshold for the housing 510 may be about-20 psi to about 0 psi, such as about-15 psi to about-1 psi, about-10 psi to about-2 psi, about-8 psi to about-3 psi, or about-6 psi to about-4 psi (including all ranges and subranges therein). For example, a low-pressure threshold for the housing 510 (and/or the fluid device 500) may be about −20 psi, −19 psi, −18 psi, −17 psi, −16 psi, −15 psi, −14 psi, −13 psi, −12 psi, −11 psi, −10 psi, −9 psi, −8 psi, −7 psi, −6 psi, −5 psi, −4 psi, −3 psi, −2 psi, −1 psi, etc.), Accordingly, if an internal pressure of the housing 510 is determined to be less than, or less than or about equal to, the low-pressure threshold then the fluid device 500 may be at risk of leaking fluid during the fluid transfer. In some variations, a pressure condition (e.g., a range of acceptable pressures, a high-pressure threshold, and/or a low-pressure threshold) for the housing 510 (and/or the fluid device 500) may be predetermined (e.g., by an operator or by the cell processing system) and/or may be adjustable (by the operator and/or by the system).

The fluid pump module 526 of the collar 520 may be a fluid pump configured to move fluid through the fluid conduits (not shown) of the collar 520. The fluid conduits may include one or more fluid conduits, such as a plurality of fluid conduits. For instance, the fluid pump may be a centrifugal pump or a positive-displacement pump. In some variations, the fluid pump module 526 may include compressible fluidic tubing exposed to an external environment of the collar 520. The compressible fluidic tubing may be coupled between an outlet port of the collar 520 which delivers fluid to the compressible fluidic tubing and an inlet port of the collar 520 which returns the fluid to the fluid conduits (not shown) of the collar 520. In particular, the compressible fluidic tubing may be proximate an external surface of the collar 520 so that an affector of the workcell may interact with the compressible fluidic tubing to move fluid therein. For example, the compressible fluidic tubing of the collar 520 and the affector of the workcell may constitute a peristaltic pump. After coupling of the fluid device 500 to, for instance, an instrument and/or a cartridge, the affector, which may be a cam mechanism (or the like) within the workcell, may be iteratively contacted against the compressible fluidic tubing. Iterative contact between the affector and the compressible fluidic tubing may result in iterative, controllable compression of the compressible fluidic tubing. Based on a direction of movement of the affector, this iterative compression may push fluid toward the inlet port of the collar 520 and pull fluid away from the outlet port of the collar 520, ultimately resulting in the transfer of fluid between the fluid device 500 and the instrument and/or cartridge. It should be appreciated, however, that the affector may be operated in other manners as well. For example, it may be operated to permit bidirectional movement of fluids within the compressible fluidic tubing and, thus, the fluid conduits of the collar 520. This bidirectional movement of fluids allows for the possibility of flowing fluids out of the fluid device 500, such as for culture medium replenishment, and also flowing fluids into the fluid device 500, such as for sample collection.

In some variations, and as shown in FIG. 5B, at least one viewing window 536 can be used, here shown as an aperture, thus providing a vantage to at least a segment of the fluid conduits 522 of the collar 520 and permitting optical evaluation of fluid movement within the fluid conduits 522. For example, a sensor disposed on the sterile liquid transfer instrument of the workcell may be aligned with the at least one viewing window 536 of the collar 520 and may detect a transition from air to liquid within the fluid conduits 522, thereby indicating the beginning of metered fluid transfer, or may detect a transition from liquid to air within the fluid conduits 522, thereby indicating an emptying of the housing 510.

In some variations, the sterile liquid transfer port 524 of the collar 520 may comprise at least one of a port 517 and a valve (not shown) and may form one part of a sterile fluid pathway between the fluid device 500 and another fluid device and/or cartridge to enable sterile, fully automated, and precisely metered (e.g., precise control of a transferred fluid volume) fluid transfer. As shown in FIG. 5A and FIG. 5B, the sterile liquid transfer port 524 may comprise a mechanical seal 525. The mechanical seal 525 may help provide sterility of a fluid transfer pathway between the fluid device 500 and another fluid device or cartridge. In some variations, a robot of the workcell, which may be a robot of a sterile liquid transfer instrument, may be configured to manipulate the fluid device 500 via the depression(s) 529 and alignment features 518 of the sterile liquid transfer port 525 to couple the fluid device 500 to the other fluid device or cartridge. Further, the robot may be configured to operate the sterile liquid transfer port 524 to open and close a set of ports and valves thereof, including the at least one of the port 517, to permit fluid flow between the fluid device 500 and the cartridge or the other fluid device (e.g., at least one air vent 532 may provide a pathway for air to enter or leave the fluid device 500).

Further, the sterilization process ports 530 may be configured to deliver sterilant (e.g., vaporized hydrogen peroxide ("VHP")) from a sterilant source within the workcell to the fluid conduits 522 and the sterile liquid transfer port 524 of the collar 520.

In some variations, the fluid conduits 522 of the collar 520 may fluidically couple each of the components of the collar 520, including the sterile liquid transfer port 524, the fluid access port 534, the fluid pump module 526, the fluid transport feature 538, the sterilization process ports 530, and the at least one air vent 532, and the housing 510 in any suitable combination. As shown in FIG. 5D, which provides a cross sectional view of a body of the collar 520, and FIG. 5E, which shows a plan view of a bottom of the collar 520, the fluid conduits 522 may be channels 563 formed within the body of the collar 520. For instance, the channels 563 may be etched into a surface of the body of the collar 520, and a substrate 562 may be coupled to the open face of the channels 563 to provide a fluid seal. The channels 563 may fluidically couple each of the components of the collar 520 within the collar 520 and with the housing 510, in any combination.

In some variations, the fluid transport feature 538 of the collar 520 comprises a venting tube 542, a liquid flow tube 546, a fluid port 543, a pressure relief port 548, and an annular seal 539. In some embodiments, the fluid transport feature 538, which is couplable to the opening 512 of the housing 510 via a threadable coupling, may be shaped and sized based on a shape and size of the opening 512 of the housing 510. For example, the fluid transport feature 538 may be substantially circular and/or cylindrical. Moreover, in addition to the annular seal of the opening 512 of the housing 510, the annular seal 539 of the fluid transport feature 538 can minimize if not eliminate fluid leakage and potential contamination resulting therefrom.

In some variations, the venting tube 542 is configured to extend through the opening 512 of the housing 510 and to be disposed within the housing 510. The venting tube 542 may extend from the opening 512 substantially into an open volume of the housing 510 and may, via the fluid conduits 522 of the collar 520, provide an air connection between the housing 510 and the external environment of the fluid device 500. In some variations, the venting tube 542 further comprises a venting tube reservoir 544 configured to capture, upon inversion of the fluid device 500, fluid trapped within the venting tube 542. In some variations, a volume of the venting tube reservoir 544 is at least larger than a maximum trappable volume of fluid within the venting tube 542. In this way, the venting tube 542 and the venting tube reservoir 544 enable the fluid device 500 to be inverted without concern for fluid leakage and/or damage to any component of the fluid device 500 (e.g., air filters).

In some variations and returning to FIG. 5A, FIG. 5B, and FIG. 5C, the liquid flow tube 546 of the fluid transport feature 538 may be configured to extend through the opening 512 of the housing 510 and to be disposed within the housing 510. The liquid flow tube 546 may extend from the opening 512 substantially into the open volume of the housing 510. The liquid flow tube 546 may provide a liquid connection between the housing 510 and the external environment of the fluid device 500. For example, the liquid flow tube 546 may be connected to the fluid access port 534 and may permit filling and/or depleting of liquid within the housing 510.

In some variations, the fluid port 543 of the fluid transport feature 538 may comprise an aperture within a body of the fluid transport feature 538. The fluid port 543 may fluidically connect the housing 510 to the sterile liquid transfer port 524 and/or to the at least one air vent 532 via the fluid conduits 522. In one variation, the fluid port 543 may be used when the fluid device 500 is inverted to allow fluid transfer out of the housing 510 and into another fluid device or cartridge via the sterile liquid transfer port 524. In another variation, when the fluid device 500 is upright, the fluid port 543 may be used to flow fluid out of the housing 510 and into e.g., a sample collection fluid device via the fluid access port 534 and the liquid flow tube 546.

Further, in some variations, the collar 520 of the fluid device 500 may further include a pressure relief valve proximate the outlet port 515 of the compressible fluidic tubing of the fluid pump module 526. The outlet port 515 may be in further fluid communication with the housing 510 via the pressure relief valve 548 such that, when there is excessive pressure at the outlet port 515, fluid can be flowed into the housing 510.

Other suitable workcells and aspects thereof, including SLTS, SLTIs, and fluid devices (e.g., SLTDs), are provided e.g., in U.S. Provisional Patent Application No. 63/456,388, filed Mar. 31, 2023, entitled "SYSTEMS, DEVICES, AND METHOS FOR FLUID TRANSFER WITHIN AN AUTOMATED CELL PROCESSING SYSTEM", and e.g., in U.S.

Provisional Patent Application No. 63/524,596, filed Jun. 30, 2023, entitled "SYSTEMS, DEVICES, AND METHOS FOR FLUID TRANSFER WITHIN AN AUTOMATED CELL PROCESSING SYSTEM", which are incorporated by reference herein.

II. Methods for Monitoring Pressure During Fluid Transfer

Also described herein are methods for fluid transfer, and for example, methods for monitoring pressure during such fluid transfer, e.g., fluid transfer within an automated cell processing system.

In general, a method for monitoring pressure within an automated cell processing system, such as the systems disclosed herein (e.g., system 100 of FIG. 1A), may include coupling (e.g., releasably coupling) a fluid device (e.g., fluid device 142 of FIG. 1A) to an instrument (e.g., instrument 112 of FIG. 1A) of the system, transferring fluid (e.g., one or more liquids) between the fluid device (e.g., a housing thereof) and the instrument, and determining an internal pressure of the fluid device (e.g., based on estimations and/or measurements made during the fluid transfer). In some variations, coupling the fluid device to the instrument may cause an air vent of the fluid device to transition from a closed configuration to an open configuration such that air may be exchanged between the fluid device and the external environment during the fluid transfer. In some variations, coupling the fluid device to the instrument may include engaging a cell processing cartridge (e.g., cartridge 114 of FIG. 1B, such as when the cartridge is interfacing with the instrument) with the fluid device. For example, when the cartridge is within a receiving bay of the instrument, the fluid device may be coupled to an instrument head of the instrument, and a fluid transfer port of the fluid device may engage a corresponding fluid transfer port of the cartridge. As such, fluid may be transferred between the fluid device and the cartridge via the instrument. In some variations, the fluid device may be configured to directly engage with the cartridge, and the coupling step 602 may instead include coupling the fluid device to the cartridge. In some variations, transferring fluid between the fluid device and the instrument may include transferring a first fluid (e.g., a first liquid) from the fluid device to the instrument, and transferring a second fluid (e.g., a second liquid) from the instrument to the fluid device. In some variations, the first and second fluids may be transferred simultaneously, or one after the other. Determining the internal pressure may include determining (e.g., indirectly) a fluid outflow rate of the first fluid and a fluid inflow rate of the second fluid with respect to the fluid device.

Moreover, determining the internal pressure may include determining one or both of a liquid flow rate and an airflow rate of liquid and air, respectively, transferring in and/or out of the fluid device. In general, liquid transferring into the fluid device may cause air within the fluid device to be pushed out (e.g., through an air vent of the device), and vice versa. In some variations, a component of the instrument, such as one or more sensors thereof (e.g., sensors 151 of FIG. 1A), may be used to indirectly determine the internal pressure. Additionally, or alternatively, in some variations, a parameter of a component of an instrument, such as an operational speed of a pump of the instrument (e.g., pump 138 of FIG. 1A) to transfer fluid between the fluid device and a cartridge associated with the instrument, may be set or observed to determine the internal pressure.

In some variations, determining the internal pressure may occur any number of times. For example, the internal pressure (e.g., a real-time internal pressure estimate) may be determined periodically, at a constant or varied rate, throughout the fluid transfer. For example, the internal pressure may be estimated periodically, such as at a rate of about 1 estimation per second(s) to about 2,000 estimations/s (e.g., about 5 estimations/s to about 1,500 estimations/s, about 10 estimations/s to about 1,000 estimations/s, about 50 estimations/s to about 500 estimations/s, about 100 estimations/s to about 250 estimations/s, about 10 estimations/s, about 20 estimations/s, about 30 estimations/s, about 40 estimations/s, about 50 estimations/s, about 60 estimations/s, about 70 estimations/s, about 80 estimations/s, about 90 estimations/s, about 100 estimations/s, or greater than about 100 estimations/s). In some variations, the internal pressure may be re-determined at a same rate as a rate of measurement of one or more sensors of the system used to estimate the pressure (e.g., at a same rate of as a rate of measurement of an airflow meter of the instrument and/or a frame rate of a camera of the instrument).

In one example, determining a real-time internal pressure of the fluid device may include recording a first determined (e.g., within a memory, such as memory 124 of FIG. 1A) internal pressure during a first fluid transfer operation, transferring the fluid device (e.g., via a robot, such as robot 116 of FIG. 1A) from a first instrument to another component of the system (e.g., to a second, different instrument), initiating a second fluid transfer operation using the fluid device, and determining a second internal pressure of the fluid device based on the first internal pressure and estimations and/or measurements (e.g., airflow and/or liquid flow rates in and/or out of the fluid device) obtained during the second fluid transfer. For example, the first internal pressure may be used in place of atmospheric pressure, as a baseline internal pressure of the fluid device, when determining the second internal pressure (using the Ideal Gas Law). In some variations, a latest (i.e., most recent) internal pressure estimate of the fluid device may be used instead of atmospheric pressure to estimate a subsequent internal pressure of the fluid device.

Moreover, the method may optionally include comparing the internal pressure of the fluid device to a pressure condition (e.g., to one or more pressure thresholds), and optionally notifying an operator when the internal pressure meets the pressure condition (e.g., when the internal pressure is above one or more high-pressure thresholds or below one or more low-pressure thresholds). In some variations, notifying the operator may include displaying (e.g., visually via a display such as display 130, or a user interface) an alert, such as a high-pressure or low-pressure alert for the fluid device. In some variations, notifying the operator may include prompting the operator to resolve the internal pressure issues for the fluid device (e.g., when the fluid device meets a pressure condition). For example, the operator may reduce or stop the fluid transfer (e.g., reduce an operational speed of or turn off a pump of the instrument to stop the liquid flow), and/or may remove the fluid device from the instrument. In some variations, the air vent of the fluid device may be unclogged (e.g., by purging air through one or more fluid pathways of the air vent) and/or opened (e.g., by the operator or by a robot of the system) in order to reduce the internal pressure. In some variations, the system may be configured to automatically resolve (e.g., in real time) the internal pressure issues for the fluid device. For example, a controller (e.g., controller 120 of FIG. 1A) may transmit a command to the instrument to stop the fluid transfer, and/or may transmit a command to a robot to remove the fluid device from the instrument (and/or replace it with a new fluid device). In some variations, the method may include setting and/or modifying the pressure condition (e.g., increasing or decreasing one or more high-pressure and/or low-pressure thresholds for the fluid device). In some variations, the method may additionally or alternatively include continuously displaying an updated internal pressure of the fluid device (e.g., updating the displayed internal pressure with a latest real-time internal pressure estimate). In some variations, displaying the internal pressure may include categorizing or providing a description (e.g., a written description, such as a label) of the internal pressure estimate. For example, the internal pressure estimate may be classified as "overpressurized" or "unsafe" when the internal pressure estimate is above a maximum high-pressure threshold; "high" or "moderate" when the internal pressure estimate is below the maximum high-pressure threshold and above a second, lower high-pressure threshold; and "underpressurized" or "unsafe" when the internal pressure estimate is below a minimum low-pressure threshold. When the internal pressure estimate is determined to be "high" or "moderate", this may indicate that the pressure is within an acceptable range but is at a high end of the range and may need to be closely monitored. This may occur when an air vent of the fluid device is partially blocked.

Further, the method may be employed simultaneously for any number of fluid devices that are in-use (e.g., transferring fluid to and/or from an instrument and/or associated cartridge) within a workcell (e.g., workcell 110) of the system. For example, a display or user interface for the system may continuously provide updated internal pressure estimates for one or more of (e.g., all of) the fluid devices in-use within the workcell.

Figure 6:
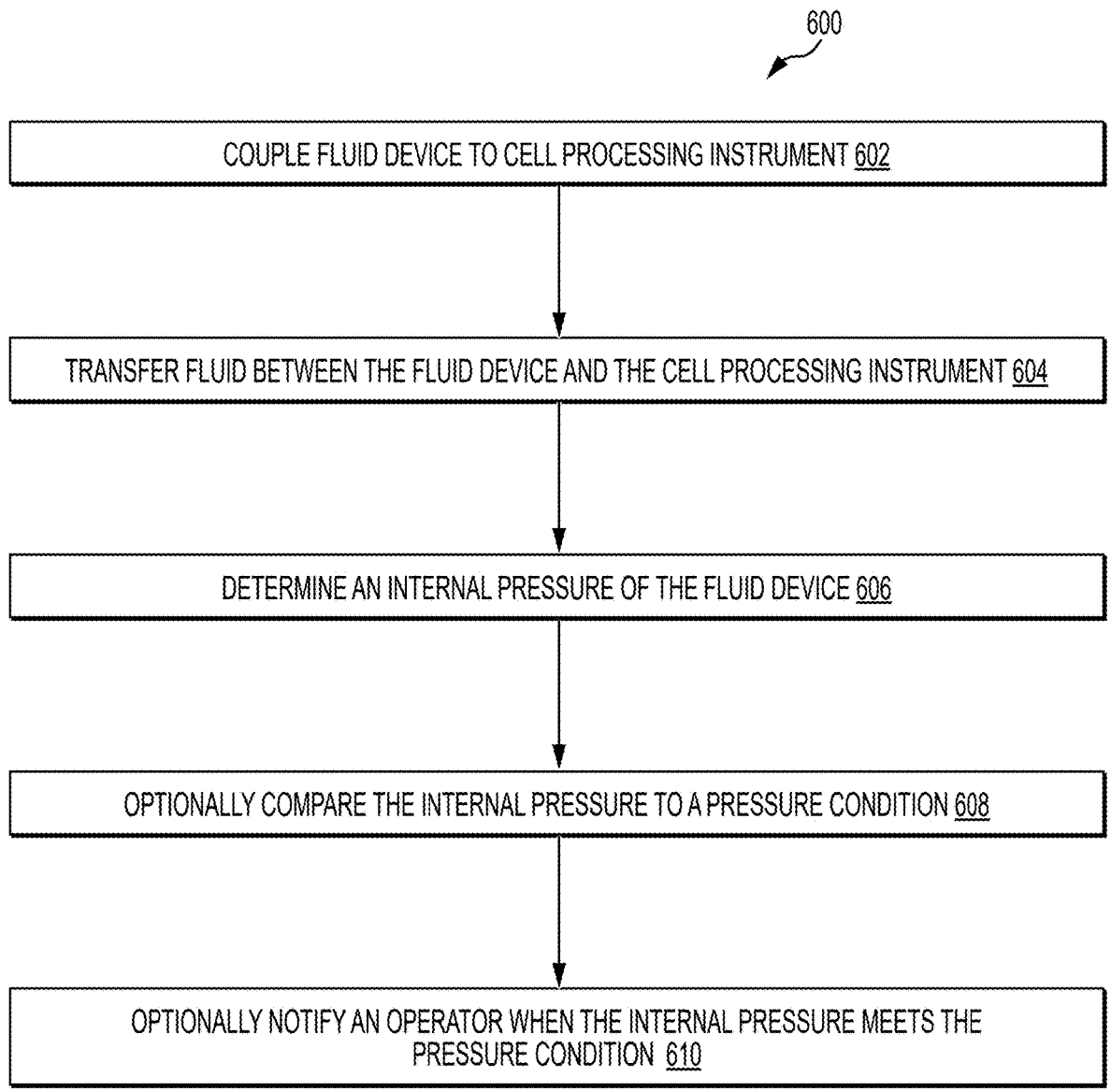
FIG. 6 is a flow diagram of an illustrative method for monitoring air pressure within an automated cell processing system.

FIG. 6 provides a flow diagram of an illustrative method 600 for monitoring air pressure within an automated cell processing system. The method 600 may include coupling 602 a fluid device to a cell processing instrument. As explained above, the coupling 602 may additionally or alternatively include coupling 602 the fluid device to a cell processing cartridge. In some variations, the coupling 602 may include releasably coupling a sterile liquid transfer device (SLTD) to a sterile liquid transfer instrument (SLTI) (e.g., to an instrument head of the SLTI). The method 600 may include transferring 604 fluid between the fluid device and the instrument. For example, the transferring 604 may include transferring liquid between the SLTD and the SLTI. In some variations, one or more fluids (e.g., liquids, such as a first liquid and a second liquid) may be transferred in and/or out of the fluid device simultaneously.

The method 600 may then include determining 606 an internal pressure of the fluid device. The determining 606 may include estimating the internal pressure based on one or more fluid flow rates, such as a liquid flow rate (e.g., one liquid flow rate, or a plurality of liquid flow rates, such as a first and second liquid flow rate) and an airflow rate with respect to the fluid device. Estimating the internal pressure may also be based on an initial pressure of the fluid device, which may be atmospheric pressure (e.g., for a new fluid device) or a latest internal pressure estimate determining during a prior fluid transfer operation of the fluid device. In some variations, the determining 606 may occur via indirect detection of the fluid flow of the fluid device. For example, an airflow meter of the instrument coupled to the fluid device may be configured to indirectly couple to the air vent of the fluid device (e.g., via tubing) and measure the airflow through the air vent. As another example, a controller of the instrument (e.g., of the system) may be configured to control the rate of liquid transfer between the fluid device and the instrument (e.g., by adjustably setting an operational speed of a pump of the instrument that couples to the fluid device during fluid transfer), and may thus provide a known liquid flow rate for determining the internal pressure. Referring again to the SLTD and SLTI, in some variations, the determining 606 may include determining a liquid transfer rate between the SLTD and SLTI, determining an airflow rate through the air vent of the SLTD, and estimating an internal pressure of the SLTD based on the airflow rate and the liquid transfer rate. The liquid flow rate may be determined indirectly (e.g., by a controller controlling the rate of fluid transfer via an operational speed of a pump of the instrument and/or by a camera observing the rotor of the pump to calculate its rotational speed). Additionally, or alternatively, the liquid flow rate may be determined directly, such as via one or more liquid flow meters of the STLD. Similarly, the airflow rate may be indirectly determined via an airflow meter of the SLTI, and/or may be determined directly via an airflow meter of the SLTD. Moreover, in some variations, the internal pressure of the SLTD may be determined using an internal sensor (e.g., a pressure gauge).

Further, as explained above, the method 600 may optionally include the steps of comparing 608 the internal pressure of the fluid device to a pressure condition and notifying 610 an operator when the internal pressure meets the pressure condition. For example, the pressure condition may include one or more thresholds, such as a low-pressure threshold and a high-pressure threshold defining an acceptable range of pressure values for the fluid device. When the internal pressure of the fluid device is determined to be out-of-range, the notifying 610 may include instructing the operator to resolve the out-of-range pressure of the fluid device (e.g., by reducing a rate of the fluid transfer and/or stopping the fluid transfer). For example, the internal pressure (measured, e.g., indirectly or directly) of an SLTD may be compared to a high-pressure threshold, and a cell processing procedure may be modified upon the internal pressure being about equal to or greater than the high-pressure threshold. Additionally, or alternatively, the internal pressure (measured, e.g., indirectly or directly) of an SLTD may be compared to a low-pressure threshold, and a cell processing procedure may be modified upon the internal pressure being about equal to or less than the low-pressure threshold. Modifying the cell processing procedure may include notifying (e.g., visually and/or audibly) an operator via a display or user interface of the system. Further, the modifying may include reducing or stopping the liquid transfer, such as by reducing an operational speed of a pump (e.g., a peristaltic pump) configured to control the liquid transfer. In some variations, the operator may be continuously informed of the internal pressure of a fluid device, regardless of whether the internal pressure meets the pressure condition.

III. Examples

Figure 7:
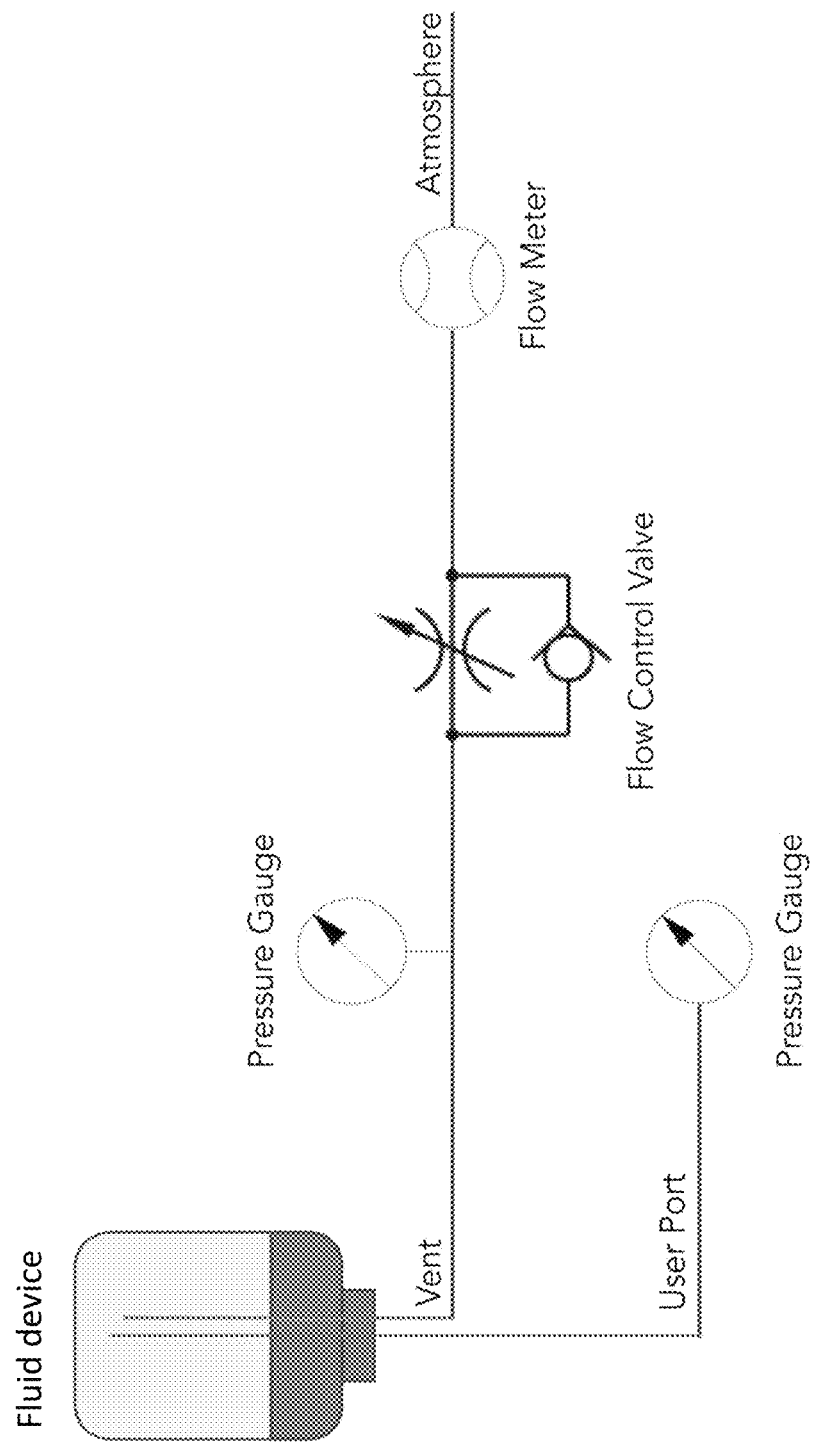
FIG. 7 is a stylized depiction of an experimental setup for monitoring pressure within a fluid device

FIG. 7 provides a stylized depiction of an experimental setup for monitoring pressure within a fluid device. The setup was used to generate the experimental results described with reference to FIGS. 8A-8C. The setup was designed to simulate a fluid device having an open air vent (results shown in FIG. 8A), partially closed or clogged air vent (results shown in FIG. 8B), and a completely closed or clogged air vent (results shown in FIG. 8B) of the fluid device. To mirror the method described herein, the internal pressure of the fluid device was estimated during these simulations using a known liquid flow rate and an air flow rate detected by the flow meter coupled thereto, and the flow control valve coupled to the vent was used to vary the airflow and volume through the vent. The internal pressure estimates were compared to reference pressure values measured using the pressure gauge at the user port. As will be explained below with reference to FIGS. 8A-8C, the results of the trials performed using the experimental setup of FIG. 7 suggest that the estimated internal pressure of the fluid device generally corresponds to the measured reference and can accurately estimate pressure within the fluid device.

Figure 8A:
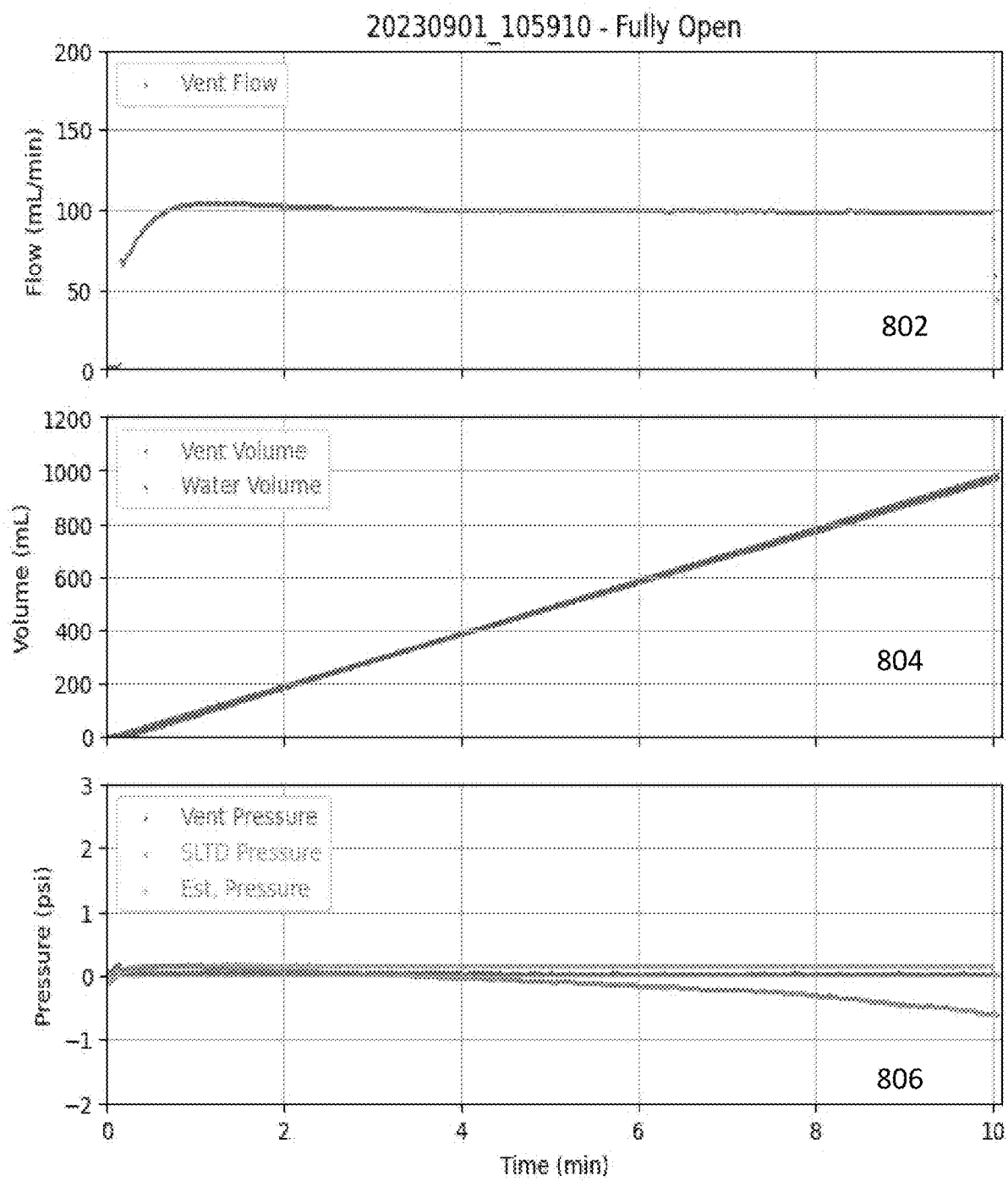
FIG. 8A depicts a graph showing an exemplary internal pressure estimation of a fluid device when an air vent of the fluid device is open.

FIG. 8A depicts an exemplary internal pressure estimation of a fluid device when an air vent of the fluid device is open. The top plot 802 shows the flow rate through the air vent throughout the 10-minute trial. The airflow was increased from about 0 mL/min to about 100 mL/min during this experiment. The liquid flow rate was set to about 100 mL/min and maintained. The middle plot 804 shows the change in air ("vent") and liquid ("water") volumes throughout the trial. As shown, both volumes increased linearly over the 10-minute period. The bottom plot 806 shows the estimated internal pressure of the fluid device during the trial. Because the air vent is completely open, the internal pressure should be about constant throughout the trial. The measured reference pressure shows this constant pressure, at 0 psi, in plot 806. In comparison, the estimated pressure shows this constant pressure during most of the trial, but deviates slightly from 0 psi (to about-0.6 psi) within the second half of the trial (due to error accumulation).

Figure 8B:
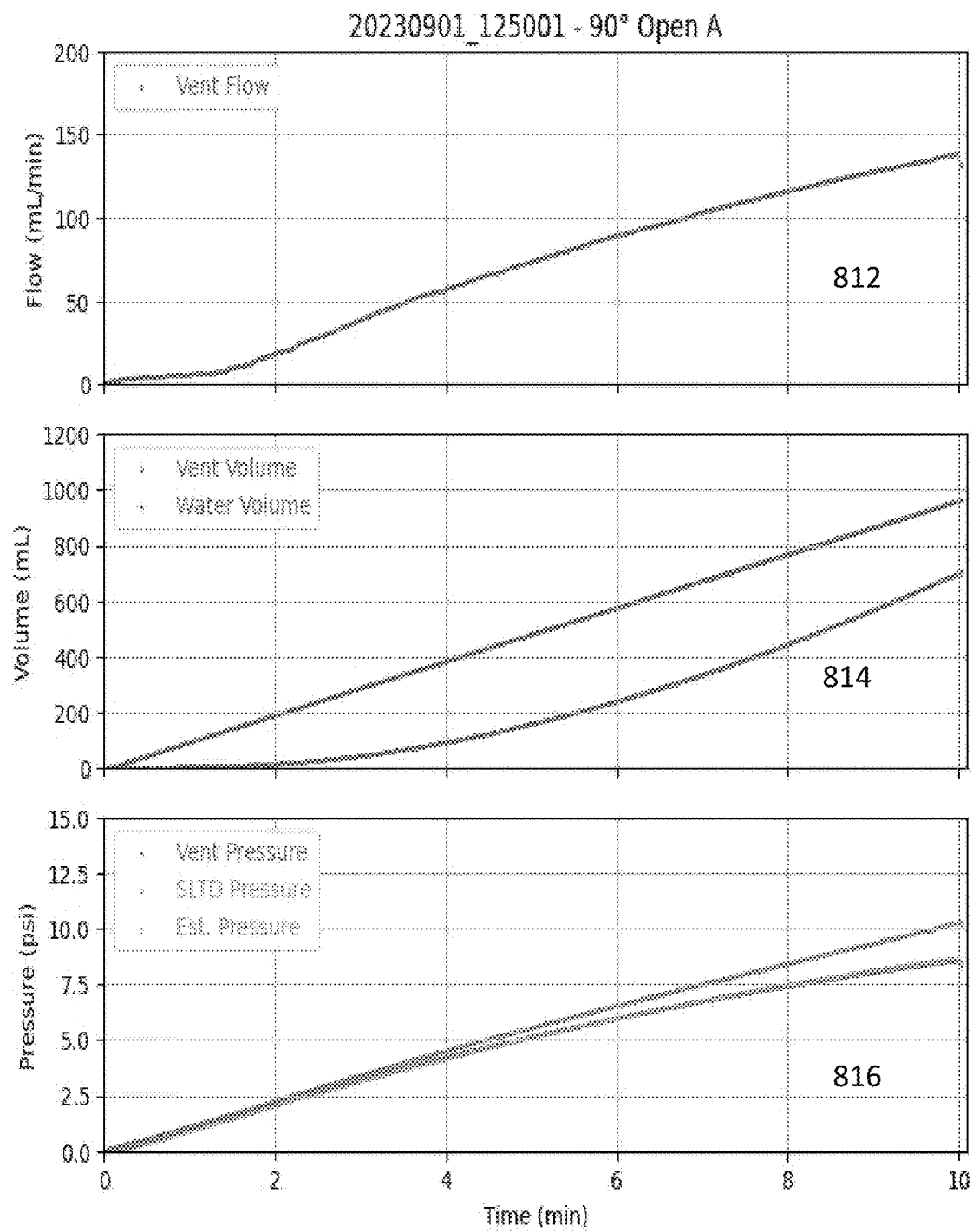
FIG. 8B depicts a graph showing an exemplary internal pressure estimation of the fluid device when the air vent of the fluid device is partially closed.

FIG. 8B shows an exemplary internal pressure estimation of the fluid device when the air vent of the fluid device is partially closed or (e.g., partially clogged). In particular, the air vent was partially open at 90 degrees. The top plot 812 shows the flow rate through the air vent throughout the 10-minute trial. The airflow was increased from about 0 mL/min to almost 150 mL/min during this experiment. The liquid flow rate was set to about 100 mL/min and maintained. The middle plot 814 shows the change in air ("vent") and liquid ("water") volumes throughout the trial. As shown, both volumes were increased over the 10-minute period. The bottom plot 816 shows the estimated internal pressure of the fluid device during the trial. Because the air vent is partially closed, the internal pressure should increase throughout the trial. The measured reference pressure shows this increase in pressure, going from about 0 psi to about 8 psi over the 10-minute period, in plot 816. In comparison, the estimated pressure also shows this increase in pressure, going from about 0 psi to about 10 psi during the trial. Again, the estimated pressure deviates slightly from the measured reference during the second half of the trial due to error accumulation.

Figure 8C:
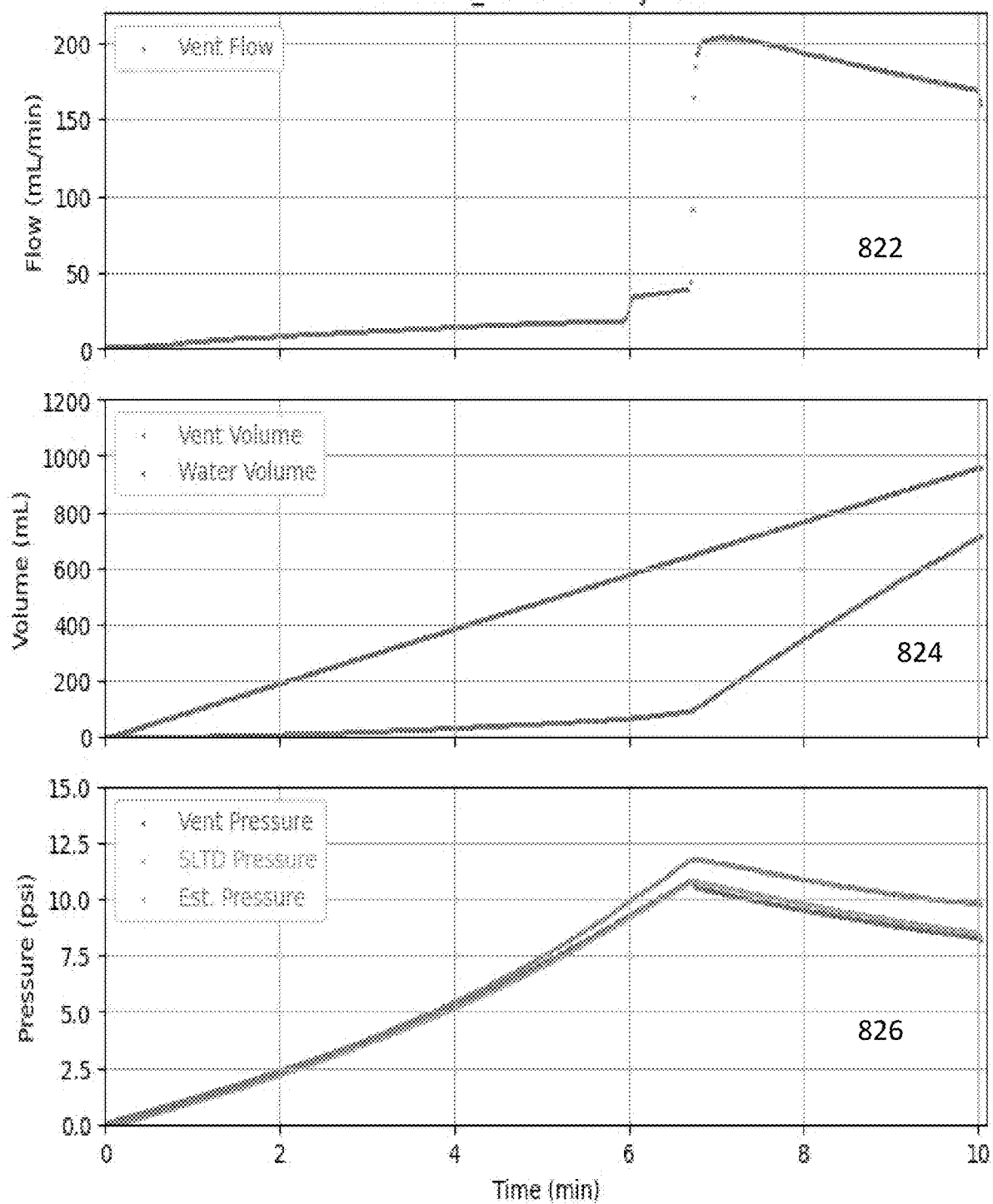
FIG. 8C depicts a graph showing an exemplary internal pressure estimation of the fluid device when the air vent of the fluid device is closed.

FIG. 8C shows an exemplary internal pressure estimation of the fluid device when the air vent of the fluid device is closed. The top plot 822 shows the flow rate through the air vent throughout the 10-minute trial. The airflow was increased from about 0 mL/min to about 200 mL/min during this experiment. The liquid flow rate was set to about 100 mL/min and maintained. The middle plot 824 shows the change in air ("vent") and liquid ("water") volumes throughout the trial. As shown, both volumes were increased over the 10-minute period, but the air volume remained low throughout most of the trial due to the blocked vent. The bottom plot 826 shows the estimated internal pressure of the fluid device during the trial. Because the air vent is closed, the internal pressure should increase throughout the trial. The measured reference pressure shows this increase in pressure, going from about 0 psi to about 10.5 psi over about a 6.5-minute period, in plot 826. In comparison, the estimated pressure also shows this increase in pressure, going from about 0 psi to about 12 psi during the 6.5-minute period. After about 6.5 minutes, the estimated and reference pressure values drop because the air vent was manually open to avoid failure of the fluid device. Again, the estimated pressure deviates slightly from the measured reference during the second half of the trial due to error accumulation.

Throughout this application, the term "about" is used to indicate that a value includes the inherent variation of error for the device, or the method being employed to determine the value, or the variation that exists among the samples being measured. Unless otherwise stated or otherwise evident from the context, the term "about" means within 10% above or below the reported numerical value (except where such a number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

The above-described systems and methods can be implemented in any of numerous ways. For example, at least some methods described herein may be implemented using hardware, firmware, software, or a combination thereof. When implemented in firmware and/or software, the firmware and/or software code can be executed on any suitable processor or collection of logic components, whether provided in a single device or distributed among multiple devices.

In this respect, various aspects described herein may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods disclosed herein need not reside on a single computer or processor but may be distributed in a modular fashion amongst a number of different computers or processors to implement various aspects of the inventions disclosed herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in different variations.

Additionally, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Further, the acts performed as part of the methods herein may be ordered in any suitable way. Accordingly, various methods may be constructed in which acts are performed in an order different than illustrated, which may include performing some acts simultaneously, even though shown as sequential acts in illustrative examples.

Additionally, it should be appreciated that ranges disclosed herein may be exemplary, and include all ranges and subranges therein.

While certain variations are described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive variations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive variations described herein. It is, therefore, to be understood that the foregoing variations are presented by way of example only and that, within the scope of the appended claims and equivalents thereto; inventive variations may be practiced otherwise than as specifically described and claimed. Inventive variations of the present disclosure are directed to each individual feature and/or method described herein. In addition, any combination of two or more such features and/or methods, if such features and/or methods are not mutually inconsistent, is included within the inventive scope of the present disclosure.

What is claimed is:

1. A method for monitoring pressure within a liquid transfer system of an automated cell processing system, comprising:
   releasably coupling a sterile liquid transfer device (SLTD) to a sterile liquid transfer instrument (SLTI), wherein the SLTD comprises a housing and an air vent, the housing configured to hold a volume of liquid;
   transferring liquid between the SLTD and the SLTI;
   determining a liquid transfer rate between the SLTD and SLTI;
   determining an airflow rate through the air vent of the SLTD; and
   estimating an internal pressure of the SLTD based on the airflow rate and the liquid transfer rate.

2. The method of claim 1, wherein determining the liquid transfer rate comprises determining an operational speed of a pump configured to control the liquid transfer.

3. The method of claim 2, wherein determining the operational speed of the pump comprises calculating the operational speed via a real-time image of the pump.

4. The method of claim 2, wherein the pump comprises a peristaltic pump.

5. The method of claim 1 further comprising:
   comparing the internal pressure of the STLD to a threshold; and
   modifying a cell processing procedure when the internal pressure is about equal to or greater than the threshold.

6. The method of claim 5, wherein modifying the cell processing procedure comprises notifying an operator via a user interface of the automated cell processing system.

7. The method of claim 6, wherein notifying the operator comprises generating one or both of a visual notification and an audio notification via the user interface.

8. The method of claim 5, wherein modifying the cell processing procedure comprises reducing or stopping the liquid transfer.

9. The method of claim 8, wherein reducing or stopping the liquid transfer comprises reducing an operational speed of a pump configured to control the liquid transfer.

10. The method of claim 1, wherein transferring liquid between the SLTD and the SLTI comprises transferring a first liquid from the SLTD to the SLTI and transferring a second liquid to the SLTD from the SLTI.

11. The method of claim 10, wherein determining the liquid transfer rate comprises:
    indirectly determining a liquid outflow rate of the first liquid from the SLTD to the SLTI, and
    indirectly determining a liquid inflow rate of the second liquid from the SLTI to the SLTD.

12. The method of claim 11, wherein estimating the internal pressure of the SLTD is based on the airflow rate, the liquid outflow rate, and the liquid inflow rate.

13. The method of claim 1, wherein the airflow rate is determined indirectly via a sensor coupled to the air vent.

14. The method of claim 1, wherein the internal pressure of the SLTD is estimated periodically at a fixed or variable time interval during the liquid transfer.

15. The method of claim 1 further comprising, prior to transferring liquid between the SLTD and the SLTI, coupling a cartridge for cell processing to the SLTI such that the cartridge and the SLTI are configured to perform a cell processing operation.

16. The method of claim 15, wherein transferring liquid between the SLTD and the SLTI comprises transferring liquid from the SLTD to the cartridge via the SLTI, or to the SLTD from the cartridge via the SLTI.

17. The method of claim 1, wherein the liquid transfer rate is a first liquid transfer rate, the airflow rate is a first airflow rate, and the internal pressure is a first internal pressure estimate, the method further comprising:
    recording the first internal pressure estimate;
    transferring the SLTD within the automated cell processing system;
    determining a second liquid transfer rate relative to the SLTD;
    determining a second airflow rate of air through the air vent of the SLTD when the air vent is in the open configuration; and
    estimating a second internal pressure of the SLTD based on the first internal pressure estimate, the airflow rate, and the second liquid transfer rate.

18. The method of claim 17, wherein the SLTI comprises a first SLTI and transferring the SLTD comprises releasing the STLD from the first SLTI and releasably coupling the SLTD to a second SLTI.

19. The method of claim 18 further comprising, prior to determining the second liquid transfer rate, transferring liquid between the SLTD and the second SLTI.

20. The method of claim 1, wherein the liquid comprises one or more of a cell culture medium, a buffer, and a solvent.

21. The method of claim 1, wherein determining the liquid transfer rate comprises directly determining the flow rate with a liquid flow rate sensor.

22. The method of claim 1, wherein the airflow rate is determined directly via a flow rate sensor at the air vent.

23. The method of claim 1, wherein the SLTD further comprises a collar couplable to the housing, the collar comprising:
 a plurality of conduits;
 a sterile liquid transfer port in fluid communication with the plurality of conduits; and
 a fluid pump module comprising compressible fluidic tubing coupled between an inlet port and an outlet port, wherein each of the inlet port and the outlet port is in fluid communication with the plurality of conduits, and wherein the compressible fluidic tubing is configured to be compressed by a pump to control movement of fluids out of the housing.

24. The method of claim 21, wherein the pump is supported by the SLTI and is releasably couplable to the compressible fluidic tubing of the SLTD.

25. A method for monitoring pressure within a fluid device of an automated cell processing system, comprising:
 releasably coupling the fluid device to an instrument for cell processing, wherein the fluid device comprises a housing and an air vent, the housing configured to hold a volume of liquid transferring liquid between the fluid device and the instrument;
 determining a liquid transfer rate between the fluid device and instrument;
 determining an airflow rate through the air vent of the fluid device; and
 estimating an internal pressure of the fluid device based on the airflow rate and the liquid transfer rate.

* * * * *